US008905383B2

United States Patent
Ko et al.

(10) Patent No.: US 8,905,383 B2
(45) Date of Patent: Dec. 9, 2014

(54) REFRIGERATOR AND METHOD OF CONTROLLING THE SAME

(71) Applicant: Samsung Electronics Co., Ltd., Suwon-si, Gyeonggi-do (KR)

(72) Inventors: Kyung Tae Ko, Gwangju (KR); Seung Wan Kang, Gwangju (KR); Jung Yeob Kim, Gwangju (KR); Ji Hoon Kim, Gwangju (KR); Byung Mo Yu, Daejeon (KR); Sung Ho Cho, Gwangju (KR); Yong Soo Kyong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/189,184

(22) Filed: Feb. 25, 2014

(65) Prior Publication Data

US 2014/0238502 A1    Aug. 28, 2014

(30) Foreign Application Priority Data

Feb. 28, 2013  (KR) .................. 10-2013-0022531
Sep. 24, 2013  (KR) .................. 10-2013-0112952

(51) Int. Cl.
*B01F 3/04* (2006.01)
*A23L 2/54* (2006.01)

(52) U.S. Cl.
CPC .............. *B01F 3/04808* (2013.01); *A23L 2/54* (2013.01); *Y10S 261/07* (2013.01)
USPC .. 261/26; 261/119.1; 261/121.1; 261/DIG. 7; 99/323.1; 426/477

(58) Field of Classification Search
USPC ......... 261/26, 119.1, 121.1, DIG. 7; 426/474, 426/477; 99/323.1
See application file for complete search history.

(56) References Cited

U.S. PATENT DOCUMENTS

| | | | | |
|---|---|---|---|---|
| 4,636,337 A * | 1/1987 | Gupta et al. | ................. | 261/64.3 |
| 4,850,269 A * | 7/1989 | Hancock et al. | ............. | 99/323.1 |
| 6,364,159 B1 * | 4/2002 | Newman et al. | ................. | 222/1 |

* cited by examiner

*Primary Examiner* — Robert A Hopkins
(74) *Attorney, Agent, or Firm* — Staas & Halsey LLP

(57) ABSTRACT

A refrigerator includes a carbonated water tank in which carbonated water is stored; a water level sensor sensing a water level of carbonated water stored in the carbonated water tank; a water tank supplying filtered water to the carbonated water tank; a carbon dioxide cylinder supplying carbon dioxide to the carbonated water tank; and a controller, if the water level of carbonated water sensed by the water level sensor is less than or equal to a predetermined minimum water level, supplying the filtered water to the carbonated water tank, and if supply of the filtered water is completed, supplying the carbon dioxide to the carbonated water tank so as to produce the carbonated water. If the carbonated water is discharged, the controller controls the water level sensor to sense the water lever of the carbonated water stored in the carbonated water tank.

30 Claims, 26 Drawing Sheets

(a) CARBONATED WATER CONCENTRATION FIRST STEP (b) CARBONATED WATER CONCENTRATION SECOND STEP (c) CARBONATED WATER CONCENTRATION THIRD STEP

REFRIGERATOR AND METHOD OF CONTROLLING THE SAME

CROSS-REFERENCE TO RELATED APPLICATIONS

This application claims the benefit of Korean Patent Applications No. 10-2013-0022531, filed on Feb. 28, 2013 and No. 10-2013-0112952 filed on Sep. 24, 2013 in the Korean Intellectual Property Office, the disclosures of which are incorporated herein by reference.

BACKGROUND

1. Field

Embodiments of the present disclosure relate to a refrigerator and a method of controlling the same, and more particularly, to a refrigerator including a carbonated water production device and a method of controlling the same.

2. Description of the Related Art

In general, a refrigerator is a home appliance that keeps food fresh by including a storage compartment for storing food and a cold air supplying unit for supplying cold air to the storage compartment. In accordance with a user's need, the refrigerator may include an ice-making device for generating ice and a dispenser that is capable of taking filtered water or ice from the outside without opening a door.

A user has a need for obtaining a processed beverage in addition to filtered water or ice from the refrigerator. However, refrigerators according to the related art provide filtered water or ice to the user but do not provide a processed beverage.

SUMMARY

Therefore, it is an aspect of the present disclosure to provide a refrigerator that is capable of selectively taking filtered water and carbonated water and automatically producing carbonated water if it is expected that the storage amount of the carbonated water is reduced or the user will not use the carbonated water for a while.

It is another aspect of the present disclosure to provide a refrigerator that is capable of rapidly producing carbonated water according to the operating instructions of a user.

Additional aspects of the disclosure will be set forth in part in the description which follows and, in part, will be apparent from the description, or may be learned by practice of the disclosure.

In accordance with one aspect of the present disclosure, a refrigerator includes a carbonated water tank, a water tank, a carbon dioxide cylinder, and a controller. The carbonated water tank may store carbonated water. The water tank may store filtered water. The carbon dioxide cylinder may store carbon dioxide. The controller may supply the filtered water to the carbonated water tank and if supply of the filtered water is completed, supply the carbon dioxide to the carbonated water tank so as to produce carbonated water. The controller, in response to discharge of the carbonated water, may calculate an accumulated discharge time of the carbonated water based on a time at which the carbonated water is discharged, and if the accumulated discharge time of the carbonated water is equal to or above a first reference time that is set in advance, resupply the carbonated water to the carbonated water tank.

If a carbonated water discharge instruction is input, the carbonated water may be discharged by pressure of carbon dioxide in the carbonated water tank.

The refrigerator may further include a carbon dioxide supply valve configured to control flow of the carbon dioxide supplied to the carbonated water tank, The controller may open the carbon dioxide supply valve for about 0.5 seconds to about 1.5 seconds with respect to the carbonated water tank so as to resupply the carbon dioxide to the carbonated water tank.

In accordance with another aspect of the present disclosure, a refrigerator includes a carbonated water tank, a water tank, a carbon dioxide cylinder and a controller. The carbonated water tank may store carbonated water. The water tank may store filtered water. The carbon dioxide cylinder may store carbon dioxide. The controller may supply the filtered water to the carbonated water tank and if supply of the filtered water is completed, supply the carbon dioxide to the carbonated water tank so as to produce carbonated water. The controller, if determined that pressure of carbon dioxide in the carbonated water tank is equal to or below a predetermined reference pressure, may resupply the carbon dioxide to the carbonated water tank after the carbonated water is produced.

The controller may supply the carbon dioxide for about 0.5 seconds to about 1.5 seconds to the carbonated water tank so as to resupply the carbon dioxide to the carbonated water tank.

The refrigerator may further include a temperature sensor sensing temperature of the carbonated water stored in the carbonated water tank. The controller, if the temperature of the carbonated water sensed by the temperature sensor is equal to or below a predetermined reference temperature, may resupply the carbon dioxide to the carbonated water tank.

The controller, if an accumulated discharge time of the carbonated water calculated based on a time at which the carbonated water is discharged is equal to or above a first reference time that is set in advance, may resupply the carbon dioxide to the carbonated water tank.

The controller may resupply again the carbon dioxide to the carbonated water tank if the accumulated discharge time is equal to or above the first reference time after the carbon dioxide is resupplied.

The controller, if elapsed time after the carbonated water is produced is equal to or above a second reference time that is set in advance, may resupply the carbon dioxide to the carbonated water tank.

The controller may resupply again the carbon dioxide to the carbonated water tank if the elapse time after the carbon dioxide is resupplied is equal to or above the second reference time.

In accordance with another aspect of the present disclosure, a method of controlling a refrigerator producing and storing carbonated water includes: supplying filtered water to the carbonated water tank; supplying carbon dioxide to the carbonated water tank if supply of the filtered water is completed; and resupplying the carbon dioxide if pressure of carbon dioxide in the carbonated water tank is lowered.

The resupplying of the carbon dioxide may include supplying the carbon dioxide to the carbonated water tank for about 0.5 seconds to about 1.5 seconds.

The resupplying of the carbon dioxide may include: sensing temperature of the carbonated water stored in the carbonated water tank; and if the sensed temperature of the carbonated water is equal to or below a predetermined reference temperature, resupplying the carbon dioxide to the carbonated water tank.

The resupplying of the carbon dioxide may include in response to discharge of the carbonated water, calculating an accumulated discharge time of the carbonated water corresponding to a total time at which the carbonated water is discharged after the carbonated water is produced; and if the accumulated discharge time is equal to or above a first reference time that is set in advance, resupplying the carbonated water to the carbonated water tank.

The resupplying of the carbon dioxide may include, if the accumulated discharge time after the resupplying of the carbon dioxide is equal to or above the first reference time, resupplying again the carbonated water to the carbonated water tank.

The resupplying of the carbon dioxide may include, if elapsed time after the carbonated water is produced is equal to or above a second reference time that is set in advance, resupplying the carbon dioxide to the carbonated water tank.

The resupplying of the carbon dioxide may include resupplying again the carbon dioxide to the carbonated water tank if elapsed time after the carbon dioxide is resupplied is equal to or above the second reference time.

In accordance with another aspect of the present disclosure, a refrigerator includes a carbonated water tank, a water tank, a carbon dioxide cylinder and a controller. The carbonated water tank may store carbonated water. The water tank may store filtered water. The carbon dioxide cylinder may store carbon dioxide. The controller may supply the filtered water to the carbonated water tank and if supply of the filtered water is completed, supply the carbon dioxide to the carbonated water tank so as to produce carbonated water. The controller, if a rapid production instruction is input, may repeat discharging of the carbon dioxide from the carbonated water tank and supplying of the carbon dioxide to the carbonated water tank.

The rapid production instruction may be input through an additional production instruction input unit.

The refrigerator may further include an exhaust valve and a supply valve. The exhaust valve discharges carbon dioxide inside of the carbonated water tank. The supply valve may open and close a carbon dioxide supply flow path that is configured to supply carbon dioxide to the carbonated water tank from the carbon dioxide cylinder. The controller may repeat the opening/closing of the exhaust valve and the opening/closing of the carbon dioxide supply valve.

The controller may open the carbon dioxide supply valve in a state that the exhaust valve is open or closed.

The controller may open the exhaust valve for about 0.5 seconds to about 5 seconds.

The controller may open the carbon dioxide supply valve for about 0.5 seconds to about 10 seconds.

The controller may repeat the opening/closing of the exhaust valve and the opening/closing of the carbon dioxide supply valve one time to 10 times.

In accordance with another aspect of the present disclosure, a method of controlling a refrigerator includes: supplying filtered water to a carbonated water tank producing and storing carbonated water; and supplying carbon dioxide to the carbonated water tank if supply of the filtered water is completed. The supplying of the carbon dioxide to the carbonated water tank may include repeating discharge of carbon dioxide from the carbonated tank and supply of carbon dioxide to the carbonated tank.

The discharging of carbon dioxide from the carbonated water tank may include opening an exhaust valve configured to discharge carbon dioxide inside of the carbonated tank for about 0.5 seconds to about 5 seconds.

The supplying of carbon dioxide to the carbonated water tank may include opening a carbon dioxide supply valve configured to open and close a carbon dioxide supply flow path supplying carbon dioxide from the carbon dioxide cylinder to the carbonated water tank for about 0.5 seconds to about 10 seconds.

The repeating of discharge and supply of carbon dioxide may include repeating discharge and supply of carbon dioxide one time to 10 times.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
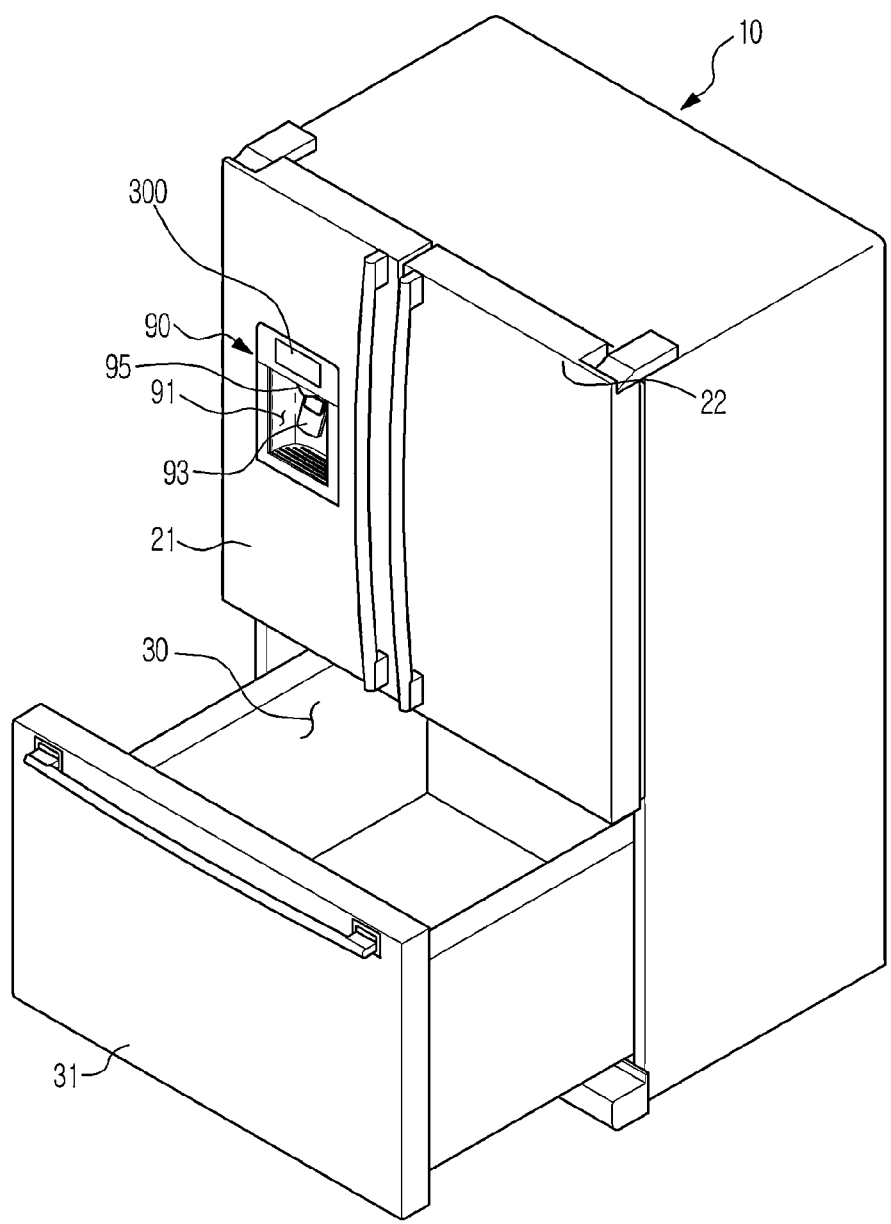
FIG. 1 is a view illustrating the exterior of a refrigerator according to an embodiment of the present disclosure.

Configurations shown in embodiments enumerated in the present specification and the drawings are just exemplary embodiments of the present disclosure, and it should be understood that there are various modified examples capable of replacing the embodiments of the present specification and the drawings.

Reference will now be made in detail to the embodiments of the present disclosure, examples of which are illustrated in the accompanying drawings, wherein like reference numerals refer to like elements throughout.

Figure 2:
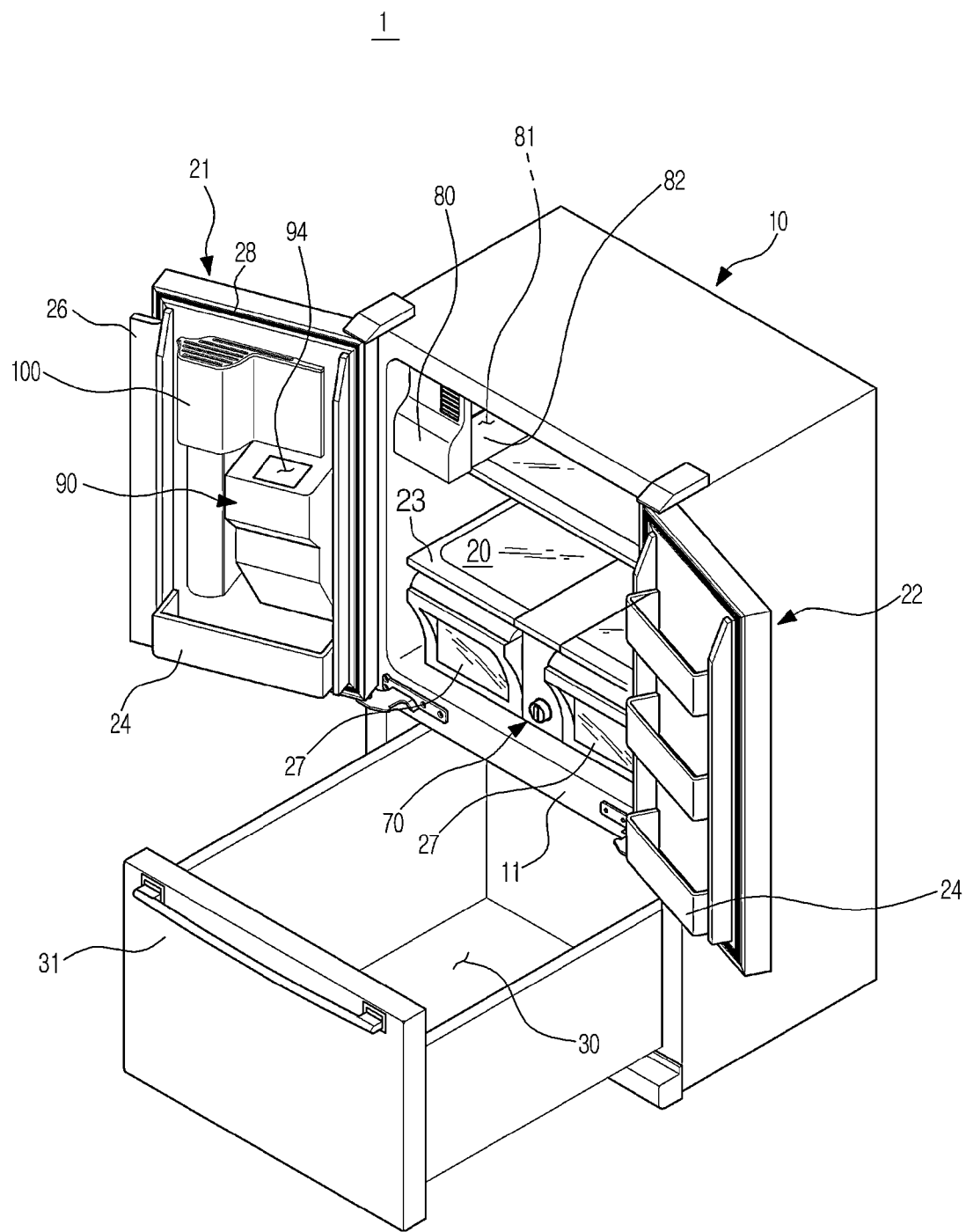
FIG. 2 is a view illustrating the inside of the refrigerator illustrated in FIG. 1.

FIG. 1 is a view illustrating the exterior of a refrigerator according to an embodiment of the present disclosure, and FIG. 2 is a view illustrating the inside of the refrigerator illustrated in FIG. 1.

Referring to FIGS. 1 and 2, a refrigerator 1 according to the current embodiment of the present disclosure may include a body 10, storage compartments 20 and 30 disposed in the body 10, and a cold air supplying unit (not shown) for supplying cold air to the storage compartments 20 and 30.

The body 10 may include an inner case that constitutes the storage compartments 20 and 30, an outer case that is combined with an outer side of the inner case and constitutes the exterior of the refrigerator 1, and a heat insulating material disposed between the inner case and the outer case.

The storage compartments 20 and 30 may be partitioned off into an upper refrigerator compartment 20 and a lower freezer compartment 30 by an intermediate wall 11. The refrigerator compartment 20 may be maintained at a temperature of about 3° C. so as to keep food under refrigeration, and the freezer compartment 30 may be maintained at a temperature of about −18.5° C. so as to keep food frozen. A shelf 23 on which food can be put, and at least one accommodation box 27 in which food is kept in a sealed state, may be provided in the refrigerator compartment 20.

Also, an ice-making compartment 81 in which ice can be made, may be formed at an upper corner of the refrigerator compartment 20 to be partitioned off into the refrigerator compartment 20 by an ice-making compartment case 82. An ice-making device 80 including an ice-making tray in which ice is made and an ice bucket in which the ice made in the ice-making tray is stored, may be disposed in the ice-making compartment 81.

A water tank 70 in which water can be stored, may be disposed in the refrigerator compartment 20. The water tank 70 may be disposed in a space between a plurality of accommodation boxes 27, as illustrated in FIG. 2. However, aspects of the present disclosure are not limited thereto, and it is enough that the water tank 70 may be disposed only in the refrigerator compartment 20 so that water in the water tank 70 can be cooled by cold air inside the refrigerator compartment 20.

Figure 5:
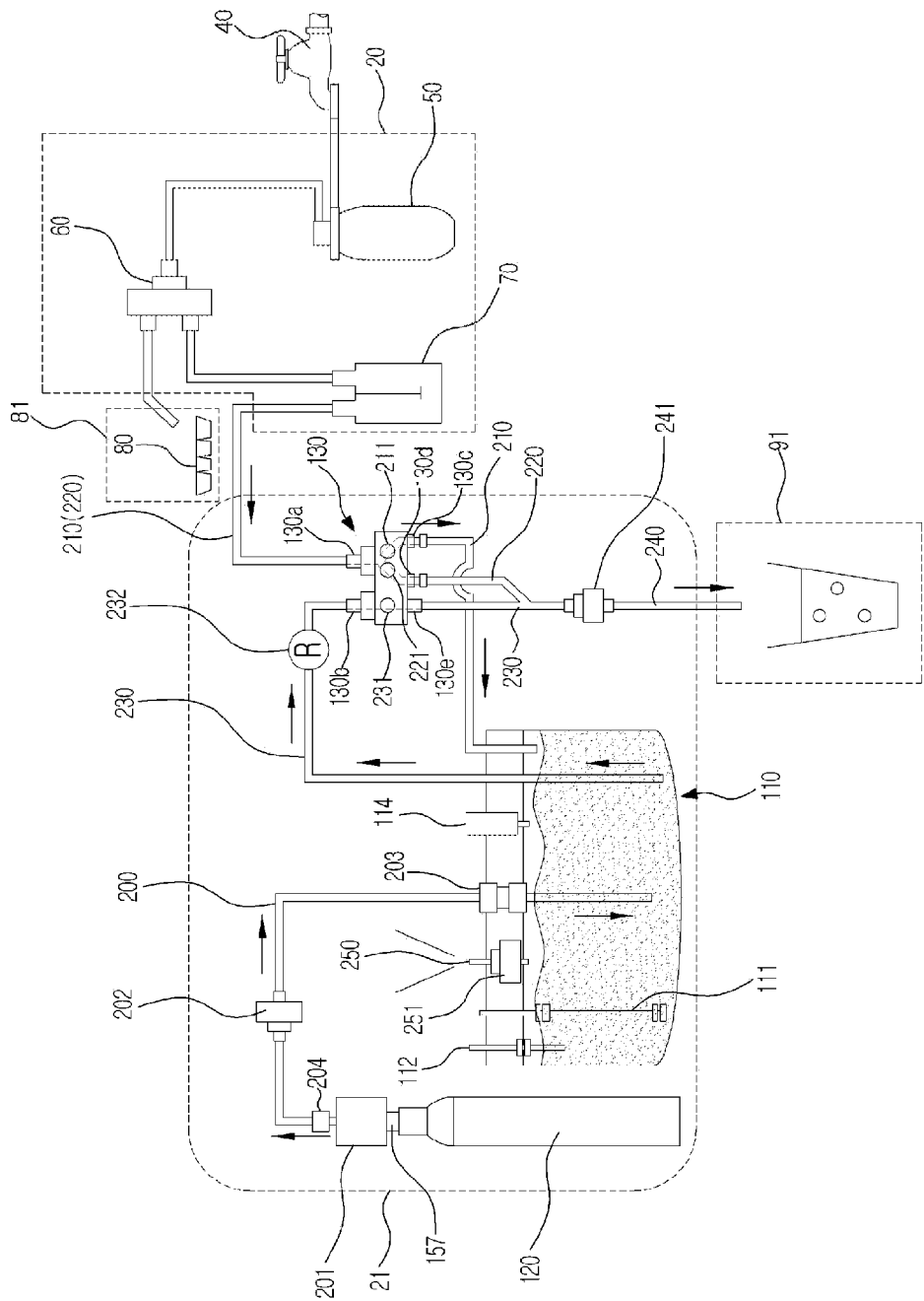
FIG. 5 is a view illustrating a process of producing and discharging carbonated water of the refrigerator of FIG. 1.

The water tank 70 may be connected to an external water supply source (see 40 of FIG. 5), such as a water pipe, and may store filtered water filtered by a water filter (see 50 of FIG. 5). A flow path conversion valve (see 60 of FIG. 5) may be disposed in a water supply pipe that connects the external water supply source 40 and the water tank 70, and water may be supplied to the ice-making device 80 via the flow path conversion valve 60.

The refrigerator compartment 20 and the freezer compartment 30 may have open front sides via which food can be put in or taken out from the refrigerator compartment 20 and the freezer compartment 30, the open front side of the refrigerator compartment 20 may be opened or closed by a pair of rotation doors 21 and 22 that are hinge-coupled to the body 10, and the open front side of the freezer compartment 30 may be opened or closed by a sliding door 31 that may slide with respect to the body 10. Door guards 24 in which food can be stored, may be disposed in rear sides of the refrigerator compartment doors 21 and 22.

Gaskets 28 may be disposed at rear edges of the refrigerator compartment doors 21 and 22 and may regulate cold air in the refrigerator compartment 20 by sealing a space between the refrigerator compartment doors 21 and 22 and the body 10 when the refrigerator compartment doors 21 and 22 are closed. Also, a rotation bar 26 may be disposed in one refrigerator compartment door 21 of the refrigerator compartment doors 21 and 22 and may regulate cold air in the refrigerator compartment 20 by sealing a space between the refrigerator compartment door 21 and the refrigerator compartment door 22 when the refrigerator compartment doors 21 and 22 are closed.

Also, a dispenser 90 may be disposed in one refrigerator compartment door 21 of the refrigerator compartment doors 21 and 22 and may take filtered water, carbonated water, or ice from the outside without opening the refrigerator compartment door 21.

The dispenser 90 may include an intake space 91 in which water or ice can be taken by inserting a container such as a cup, a dispenser lever 93 that causes the dispenser 90 to operate so that filtered water, carbonated water, or ice can be discharged, and a dispenser nozzle 95 through which filtered water or carbonated water is discharged. A user may input a carbonated water discharge instruction or a filtered water discharge instruction to the refrigerator 1 by pressurizing the dispenser lever 93 and may input a carbonated water discharge termination instruction or a filtered water discharge termination instruction to the refrigerator 1 by stopping pressurizing of the dispenser lever 93. That is, if the dispenser lever 93 is pressurized, the refrigerator 1 discharges filtered water or carbonated water until pressurization of the dispenser lever 93 is terminated.

Also, the dispenser 90 may include an ice guide path 94 that connects the ice-making device 80 and the intake space 91 so that ice made by the ice-making device 80 can be discharged into the intake space 91.

A control panel 300 receives operating instructions of the refrigerator 1 from the user and displays operating information of the refrigerator 1 to the user. The control panel 300 will be described below in detail.

A carbonated water production module 100 may be mounted in a rear side of the refrigerator compartment door 21 in which the dispenser 90 of the refrigerator 1 of FIG. 1 is disposed. The carbonated water production module 100 will be described below in detail.

Figure 3:
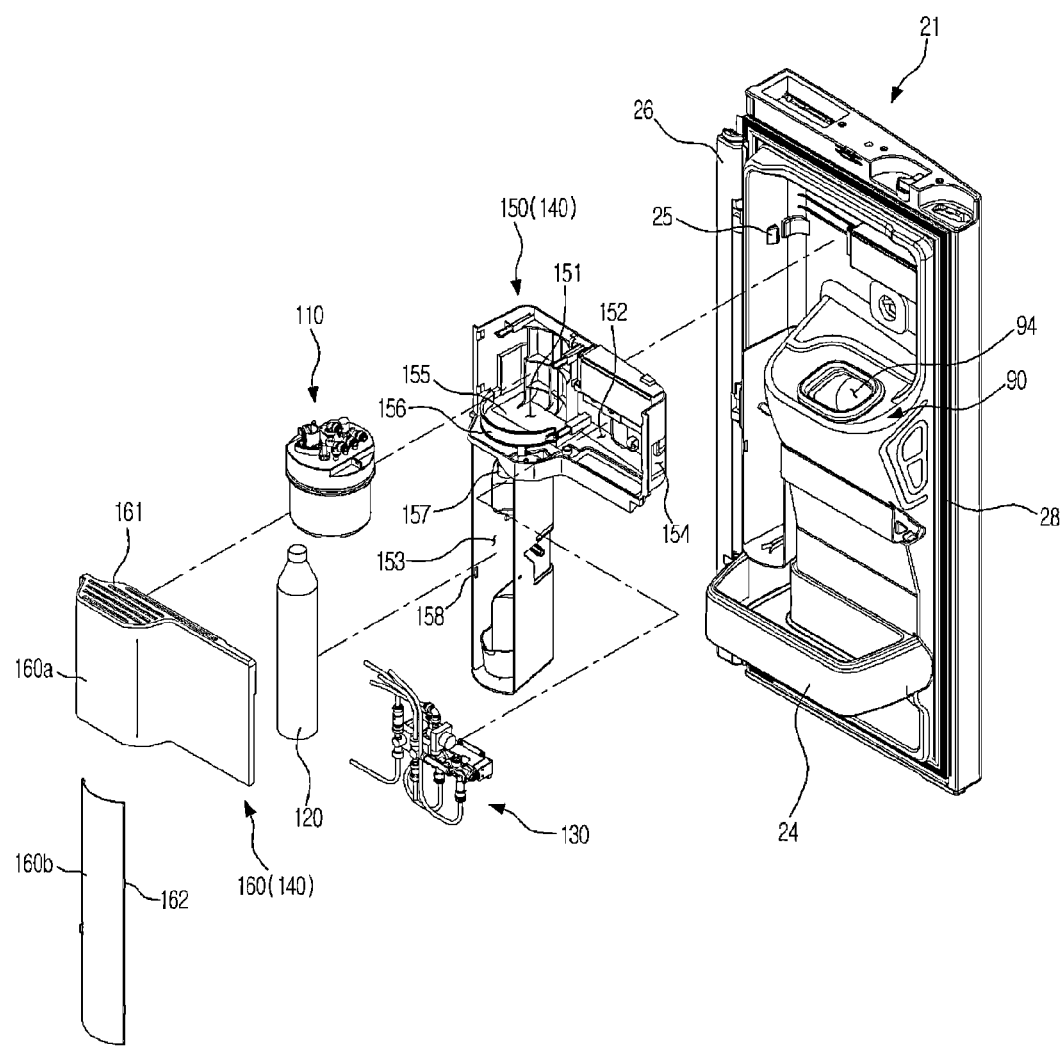
FIG. 3 is a view illustrating an assembling structure of a carbonated water production module of the refrigerator of FIG. 1.
Figure 4:
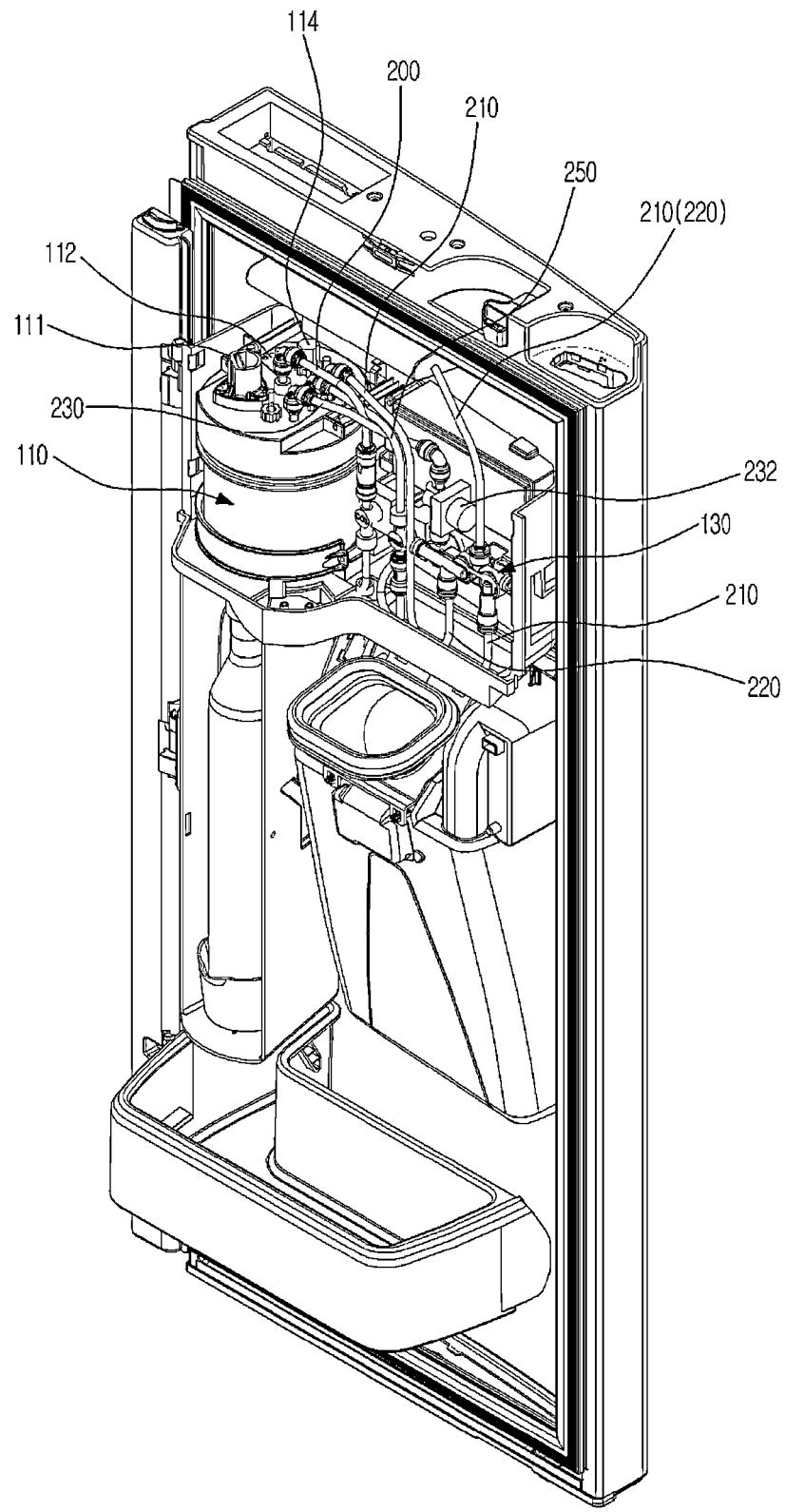
FIG. 4 is a view illustrating a state in which a cover is detached from the carbonated water production module of the refrigerator of FIG. 1.

FIG. 3 is a view illustrating an assembling structure of a carbonated water production module of the refrigerator 1 of FIG. 1, FIG. 4 is a view illustrating a state in which a cover is detached from the carbonated water production module of the refrigerator 1 of FIG. 1, and FIG. 5 is a view illustrating a process of producing and discharging carbonated water of the refrigerator 1 of FIG. 1.

The carbonated water production module 100 is used to produce carbonated water in the refrigerator 1. As illustrated in FIGS. 3 through 5, the carbonated water production module 100 may include a carbon dioxide cylinder 120 in which high-pressure carbon dioxide is stored, a carbonated water tank 110 in which filtered water and carbon dioxide are mixed with each other to make carbonated water and the carbonated water is stored, a module case 140 that includes accommodation spaces 151, 152, and 153 in which the carbon dioxide cylinder 120 and the carbonated water tank 110 are accommodated and that is combined with the rear side of the refrigerator compartment door 21, and an integrated valve assembly 130 that controls the flow of filtered water or carbonated water.

Carbon dioxide having a high pressure of about 45 to 60 bar may be stored in the carbon dioxide cylinder 120. The carbon dioxide cylinder 120 may be mounted in a cylinder connector 157 of the module case 140 and may be accommodated in a lower accommodation space 153 of the module case 140.

Carbon dioxide in the carbon dioxide cylinder 120 may be supplied to the carbonated water tank 110 via a carbon dioxide supply flow path 200 that connects the carbon dioxide cylinder 120 and the carbonated water tank 110.

A carbon dioxide regulator 201 that regulates pressure of carbon dioxide, a pressure sensor 204 that senses a discharge pressure of carbon dioxide, a carbon dioxide supply valve 202 that opens or closes the carbon dioxide supply flow path 200, and a carbon dioxide backflow prevention valve 203 that prevents backflow of carbon dioxide may be disposed in the carbon dioxide supply flow path 200.

The carbon dioxide regulator 201 may be disposed in a carbon dioxide outlet of the carbon dioxide cylinder 120 and may regulate the pressure of carbon dioxide discharged from the carbon dioxide cylinder 120. In detail, the carbon dioxide regulator 201 may reduce the pressure of carbon dioxide supplied to the carbonated water tank 110 to about 8.5 bar.

The pressure sensor 204 is disposed in a carbon dioxide outlet of the carbon dioxide regulator 201. Also, the pressure sensor 204 senses the pressure of carbon dioxide decompressed by the carbon dioxide regulator 201 and outputs a signal corresponding to the sensed pressure. If the pressure of carbon dioxide decompressed by the carbon dioxide regulator 201 is reduced less than a predetermined reference pressure, the pressure sensor 204 for carbon dioxide may adopt a pressure switch that outputs a signal corresponding to the reduced pressure of carbon dioxide.

In the carbonated water tank 110, carbon dioxide supplied by the carbon dioxide cylinder 120 and filtered water supplied by the water tank 70 may be mixed with each other to produce carbonated water, and the produced carbonated water may be stored.

A filtered water supply flow path 210 to which filtered water is supplied from the water tank 70, a carbonated water discharge flow path 230 on which produced carbonated water is discharged through the dispenser nozzle 95, and an exhaust flow path 250 on which carbon dioxide that remains in the carbonated water tank 110 is exhausted so as to supply filtered water to the carbonated water tank 110, in addition to the above-described carbon dioxide supply flow path 200 may be connected to the carbonated water tank 110.

A filtered water supply valve 211 may be disposed in the filtered water supply flow path 210 to open or close the filtered water supply flow path 210. A carbonated water discharge valve 231 that opens or closes the carbonated water discharge flow path 230 and a carbonated water regulator 232 that regulates the pressure of discharged carbonated water may be disposed in the carbonated water discharge flow path 230. An exhaust valve 251 may be disposed in the exhaust flow path 250 to open or close the exhaust flow path 250. Here, the filtered water supply valve 211 and the carbonated water discharge valve 231 may be solenoid valves.

A water level sensor 111 that may measure the amount of filtered water supplied to the carbonated water tank 110 and a temperature sensor 112 that may measure the temperature of filtered water supplied to the carbonated water tank 110 or the temperature of carbonated water produced in the carbonated water tank 110 may be disposed in the carbonated water tank 110.

Also, a safety valve 114 may be disposed in the carbonated water tank 110 to discharge high-pressure carbon dioxide when the high-pressure carbon dioxide exceeding a predetermined pressure is supplied to the carbonated water tank 110 due to a malfunction of the carbon dioxide regulator 201.

The carbonated water tank 110 may be formed with a predetermined size and may be formed to accommodate filtered water of about 1 l. Also, the carbonated water tank 110 may be formed of stainless steel so as to minimize the size of the carbonated water tank 110, to withstand a high pressure, and to have a corrosion resistance. The carbonated water tank 110 may be accommodated in a first upper accommodation space 151 of the module case 140. The carbonated water tank 110 may be supported by a bottom support part 155 and a guide part 156 of the module case 140.

Also, a water leak sensing sensor 115 that senses water leak of the carbonated water tank 110 may be disposed in the first upper accommodation space 151 or a second upper accommodation space 152. The water leak sensing sensor may include a pair of electrodes and may apply a voltage between the pair of electrodes and sense a current flowing through the pair of electrodes, thereby sensing water leak.

The above-described filtered water supply valve 211 and the carbonated water discharge valve 231 may constitute an integrated valve assembly 130 together with a filtered water discharge valve 221 disposed in a filtered water discharge flow path 220 on which filtered water is directly discharged from the water tank 70 to the intake space 91. That is, the filtered water supply valve 211, the carbonated water discharge valve 231, and the filtered water discharge valve 221 may be formed integrally with one another. Here, the filtered water discharge valve 221 may be a solenoid valve, like the filtered water supply valve 211 and the carbonated water discharge valve 231.

The integrated valve assembly 130 may include a first inlet port 130a connected to the water tank 70, a second inlet port 130b connected to the carbonated water tank 110, a first outlet port 130c connected to the carbonated water tank 110, and a second outlet port 130d and a third outlet port 130e that are connected to the dispenser nozzle 95.

The filtered water supply flow path 210 and the filtered water discharge flow path 220 may pass through the first inlet port 130a, and the carbonated water discharge flow path 230 may pass through the second inlet port 130b. The filtered water supply flow path 210 may pass through the first outlet port 130c, the filtered water discharge flow path 220 may pass through the second outlet port 130d, and the carbonated water discharge flow path 230 may pass through the third outlet port 130e.

However, the filtered water supply valve 211, the filtered water discharge valve 221, and the carbonated water discharge valve 231 may be individually opened or closed.

Also, in the present embodiment, the integrated valve assembly 130 includes three individual valves 211, 221, and 231, as described above. However, the integrated valve assembly 130 may include one three-way flow path conversion valve that allows filtered water to selectively flow into the carbonated water tank 110 or the intake space 91 from the water tank 70 and another three-way flow path conversion valve that supplies filtered water from the water tank 70 to the intake space 91 or supplies carbonated water from the carbonated water tank 110 to the intake space 91.

The integrated valve assembly 130 may be accommodated in the second upper accommodation space 152 of the module case 140.

The filtered water discharge flow path 220 on which filtered water is directly discharged from the water tank 70 to the intake space 91, and the carbonated water discharge flow path 230 on which carbonated water in the carbonated water tank 110 is discharged into the intake space 91 may meet at one point and may constitute an integrated discharge flow path 240.

The filtered water discharge flow path 220 and the carbonated water discharge flow path 230 may meet at an outside of the integrated valve assembly 130. Thus, the dispenser nozzle 95 may be disposed by forming the filtered water discharge flow path 220 and the carbonated water discharge flow path 230 integrally with each other. Of course, the filtered water discharge flow path 220 and the carbonated water discharge flow path 230 may not meet but may extend to the dispenser nozzle 95 separately.

A remaining water discharge prevention valve 241 may be disposed on the integrated discharge flow path 240 to open or close the integrated discharge flow path 240 so that filtered water or carbonated water remaining in the integrated discharge flow path 240 cannot be discharged into the intake space 91 in a state in which the filtered water discharge valve 221 and the carbonated water discharge valve 231 are closed. The remaining water discharge prevention valve 241 may be disposed at an end of the integrated discharge flow path 240, if possible.

The module case 140 may include a back case 150 having one open side and a cover 160 that is combined with the open side of the back case 150.

The module case 140 may include at least one insertion groove 154 that is formed in a position corresponding to at least one insertion protrusion 25 formed on the rear side of the refrigerator compartment door 21. Thus, the insertion protrusion 25 is inserted into the insertion groove 154 so that the module case 140 can be easily mounted in the rear side of the refrigerator compartment door 21. However, the combination structure is just an exemplary structure, and the module case 140 may be detachably mounted in the rear side of the refrigerator compartment door 21 through various combination structures including a screw fastening structure, a hook coupling structure, and the like, in addition to the insertion structure.

Also, an insertion groove 158 and an insertion protrusion 162 may be formed in a position where the insertion groove 158 and the insertion protrusion 162 correspond to each other, of the back case 150 and the cover 160 so that the cover 160 can be combined with the back case 150. However, the combination structure is also an exemplary structure, and the back case 150 and the cover 160 may be detachably combined with each other through various combination structures.

The carbon dioxide cylinder 120, the carbonated water tank 110, and the integrated valve assembly 130 inside the module case 140 may not be exposed to the outside in a state in which the cover 160 is combined with the back case 150. Thus, the refrigerator compartment door 21 may be aesthetically appealing.

However, air vents 161 that communicate with the inside and the outside of the module case 140 may be formed in the cover 160 so that, even when the cover 160 is combined with the back case 150, cold air in the storage compartment can be supplied to the carbonated water tank 110 inside the module case 140 and carbonated water stored in the carbonated water tank 110 can be cooled or maintained at an appropriate temperature.

Also, the cover 160 may be detachably disposed to include a first cover 160a that opens or closes the upper accommodation spaces 151 and 152 in which the carbonated water tank 110 and the integrated valve assembly 130 are accommodated, and a second cover 160b that opens or closes the lower accommodation space 153 in which the carbon dioxide cylinder 120 is accommodated. The first cover 160a and the second cover 160b may be individually opened or closed.

Thus, when carbon dioxide in the carbon dioxide cylinder 120 is exhausted and the carbon dioxide cylinder 120 is replaced with another one, the carbon dioxide cylinder 120 may be replaced with another one by detaching only the second cover 160b without the need of opening the first cover 160a. Thus, even when the carbon dioxide cylinder 120 is replaced with another one, the first cover 160a may be maintained in a closed state and cold air in the upper accommodation space 151 may be prevented from flowing out to the outside.

In another point of view, the carbonated water production module 100 of the refrigerator 1 of FIG. 1 may include a first module having the carbonated water tank 110 and the first accommodation space 151 in which the carbonated water tank 110 is accommodated, and a second module having the carbon dioxide cylinder 120, and the second accommodation space 153 in which the carbon dioxide cylinder 120 is accommodated.

In this case, a second module may be disposed below the first module. Also, the second module may be disposed at a side of the ice guide path 94 on which ice in the ice-making device 80 are guided to the intake space 91.

Also, the first module may include the first cover 160a that opens or closes the first accommodation space 151, and the second module may include the second cover 160b that opens or closes the second accommodation space 153 individually from the first cover 160a.

Figure 6:
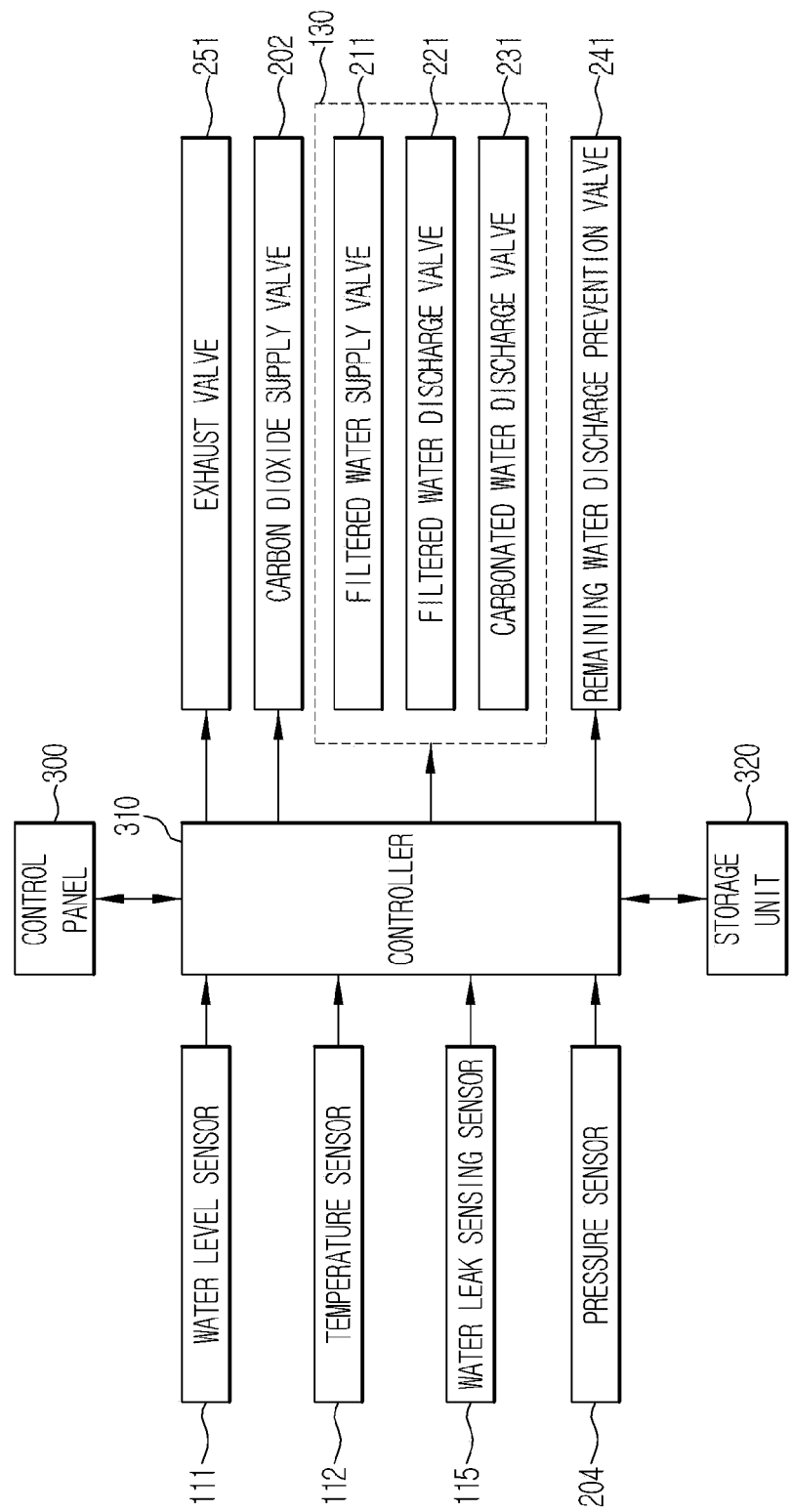
FIG. 6 is a block diagram illustrating a control flow of the refrigerator of FIG. 1.
Figure 7:
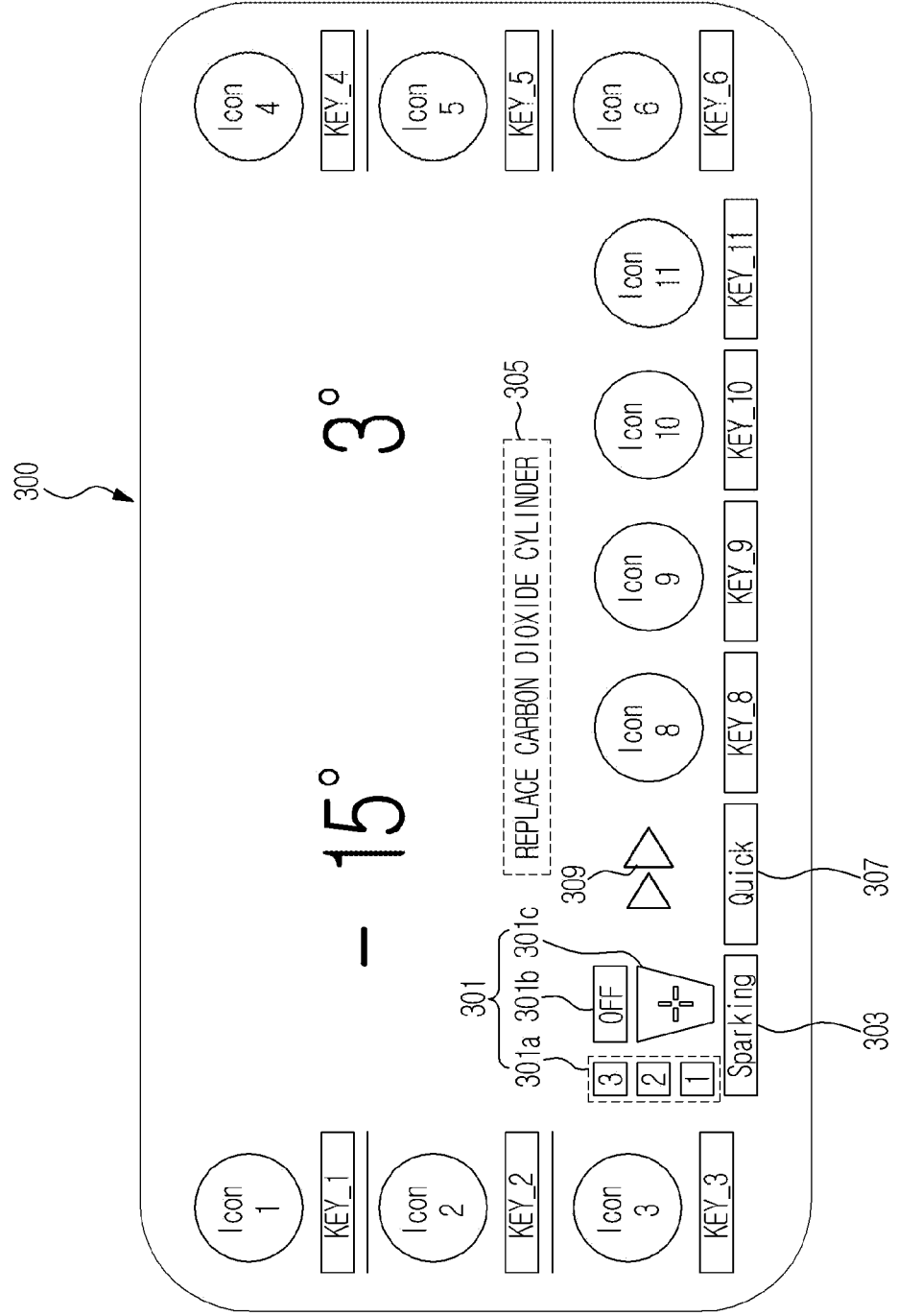
FIG. 7 is a view illustrating a control panel of the refrigerator of FIG. 1.

FIG. 6 is a block diagram illustrating a control flow of the refrigerator 1 of FIG. 1, and FIG. 7 is a view illustrating a control panel of the refrigerator 1 of FIG. 1.

Referring to FIGS. 6 and 7, the refrigerator 1 of FIG. 1 includes the water level sensor 111, the temperature sensor 112, the water leak sensing sensor 115, the pressure sensor 204, the exhaust valve 251, the carbon dioxide supply valve 202, the remaining water discharge prevention valve 241 and the integrated valve assembly 130 in which the filtered water supply valve 211, the filtered water discharge valve 221, and the carbonated water discharge valve 231 are formed integrally with one another, so as to produce carbonated water. Also, the refrigerator 1 includes the control panel 300 that receives operating instructions from the user and displays operating information of the refrigerator 1, a controller 310 that controls an operation of the refrigerator 1, and a storage unit 320 that stores a program or data for controlling the refrigerator 1.

Descriptions of the above-described water level sensor 111, temperature sensor 112, water leak sensing sensor 115, carbon dioxide pressure sensor 204, the exhaust valve 251, the carbon dioxide supply valve 202, and the integrated valve assembly 130 in which the filtered water supply valve 211, the filtered water discharge valve 221, and the carbonated water discharge valve 231 are formed integrally with one another will be omitted.

The control panel 300 includes an input unit to which a user's operating instructions are input, and a display unit that displays operating information of the refrigerator 1. In particular, the control panel 300 includes a carbonated water production instruction input unit 303 to which the user's operating instructions related to carbonated water production are input, a rapid production instruction input unit 307, a carbonated water production information display unit 301 that displays operating information of the refrigerator 1 related to carbonated water production, and a rapid production information display unit 309.

The carbonated water production instruction input unit 303 receives a carbonated water production activation instruction to activate carbonated water production, a carbonated water production deactivation instruction to deactivate carbonated water production, and a carbonated water concentration selection instruction to select the concentration (a first step, a second step, and a third step) of carbonated water produced by the refrigerator 1 from the user. In addition, the rapid production instruction input unit 307 may receive a carbonated water rapid production instruction from a user. For example, when previously produced carbonated water is used up, and a user has difficulty in instantly using carbonated water, the user may enter a carbonated water rapid production instruction through the rapid production instruction input unit 307, and the refrigerator 1 having received the carbonated water rapid production instruction may produce carbonated water within several minutes. An input unit including the carbonated water production instruction input unit 303 and the rapid production instruction input unit 307 may adopt a pressurization type switch or a touchpad.

The carbonated water production information display unit 301 includes a carbonated water concentration display region 301a in which the concentration of carbonated water produced by the refrigerator 1 is displayed, a carbonated water production display region 301b in which activation of carbonated water production of the refrigerator 1 is displayed, a carbonated water production situation display region 301c in which a carbonated water production proceeding situation of the refrigerator 1 is displayed, and a carbon dioxide low-pressure display region 305 in which a replacement time of the carbon dioxide cylinder 120 is displayed. In addition, the rapid production information display unit 309 displays whether or not the rapid production of carbonated water is activated. The display unit including the carbonated water production information display unit 301 and the rapid production information display unit 309 may adopt a liquid crystal display (LCD) panel or a light emitting diode (LED) panel.

The control panel 300 of the refrigerator 1 of FIG. 1 includes the input unit and the display unit separately. However, aspects of the present disclosure are not limited thereto, and the control panel 300 may adopt a touchscreen panel (TSP) in which the input unit and the display unit are formed integrally with each other.

The controller 310 controls the water level sensor 111, the temperature sensor 112, the carbon dioxide pressure sensor 204, the exhaust valve 251, the carbon dioxide supply valve 202, and the integrated valve assembly 130 in which the filtered water supply valve 211, the filtered water discharge valve 221, and the carbonated water discharge valve 231 are formed integrally with one another based on information transmitted from the control panel 300.

The storage unit 320 may store operating information of the refrigerator 1 temporarily in addition to the program and data for controlling the refrigerator 1.

Figure 8:
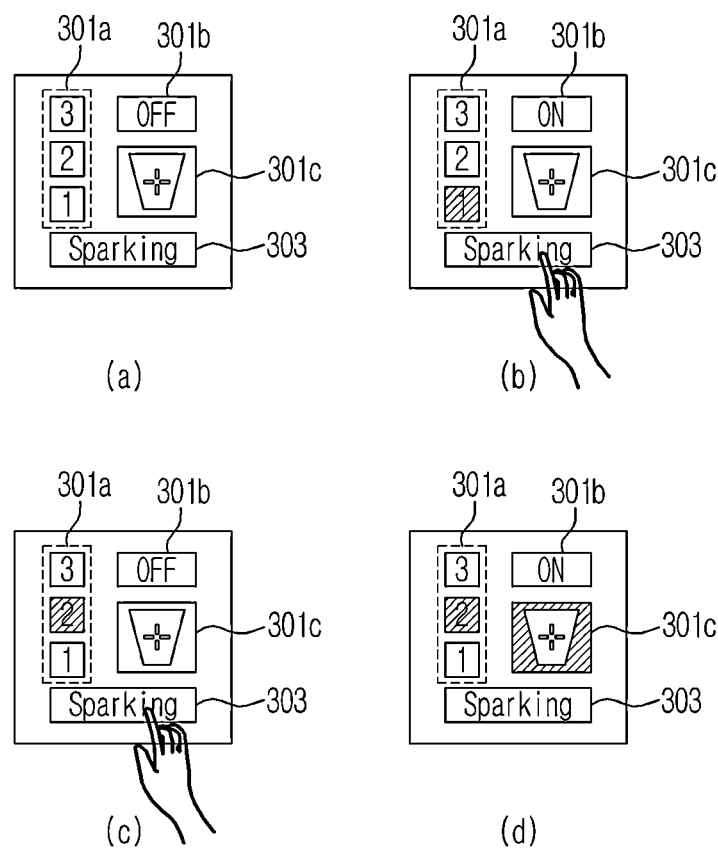
FIG. 8 is a view illustrating the case that the refrigerator of FIG. 1 receives operating instructions related to carbonated water production from a user.

FIG. 8 is a view illustrating the case that the refrigerator of FIG. 1 receives operating instructions related to carbonated water production from the user.

If power is initially applied to the refrigerator 1, the refrigerator 1 sets carbonated water production in a deactivated state and displays that carbonated water production has been deactivated (OFF) in the carbonated water production display region 301b of the carbonated water production information display unit 301, as illustrated in (a) of FIG. 8.

The user may input the carbonated water production activation instruction to activate carbonated water production or the carbonated water production deactivation instruction to deactivate carbonated water production to the refrigerator 1 through the carbonated water production instruction input unit 303. In detail, if the user touches or presses the carbonated water production instruction input unit 303 for a long time in a state in which carbonated water production is deactivated, the refrigerator 1 activates carbonated water production. Also, the refrigerator 1 displays that carbonated water production has been activated (ON) in the carbonated water production display region 301b and displays "first step" or "low concentration" that is an initial value in the carbonated water production concentration display region 301a, as illustrated in (b) of FIG. 8.

If the user touches or presses the carbonated water production instruction input unit 303 for a long time in a state in which carbonated water production has been activated, the refrigerator 1 deactivates carbonated water production and displays that carbonated water production has been deactivated (OFF) in the carbonated water production display region 301b.

Also, the user may select the concentration of carbonated water through the carbonated water production instruction input unit 303. In detail, if the user touches or presses the carbonated water production instruction input unit 303 for a short time in a state in which carbonated water production has been activated, the refrigerator 1 increases the concentration of carbonated water produced by one step. That is, when the concentration of carbonated water is "first step" or "low concentration" and if the user touches or presses the carbonated water production instruction input unit 303 for a short time, the refrigerator 1 increases the concentration of carbonated water to "second step" or "medium concentration" and displays "second step" or "medium concentration" in the carbonated water production concentration display region 301a, as illustrated in (c) of FIG. 8. When the concentration of carbonated water is "second step" or "medium concentration" and if the user touches or presses the carbonated water production instruction input unit 303 for a short time, the refrigerator 1 increases the concentration of carbonated water to "third step" or "high concentration". However, when the concentration of carbonated water is "third step" or "high concentration" and if the user touches or presses the carbonated water production instruction input unit 303 for a short time, the refrigerator 1 decreases the concentration of carbonated water to "first step" or "low concentration".

When the refrigerator 1 is producing carbonated water, the refrigerator 1 displays that carbonated water is being produced in the carbonated water production situation display region 301c, as illustrated in (d) of FIG. 8.

As described above, the configuration of the refrigerator 1 of FIG. 1 has been described in detail.

Hereinafter, producing carbonated water using the refrigerator 1 of FIG. 1 will be described. The refrigerator 1 produces carbonated water in a state in which carbonated water production has been activated and does not produce carbonated water in a state in which carbonated water production has been deactivated.

Figure 9A:
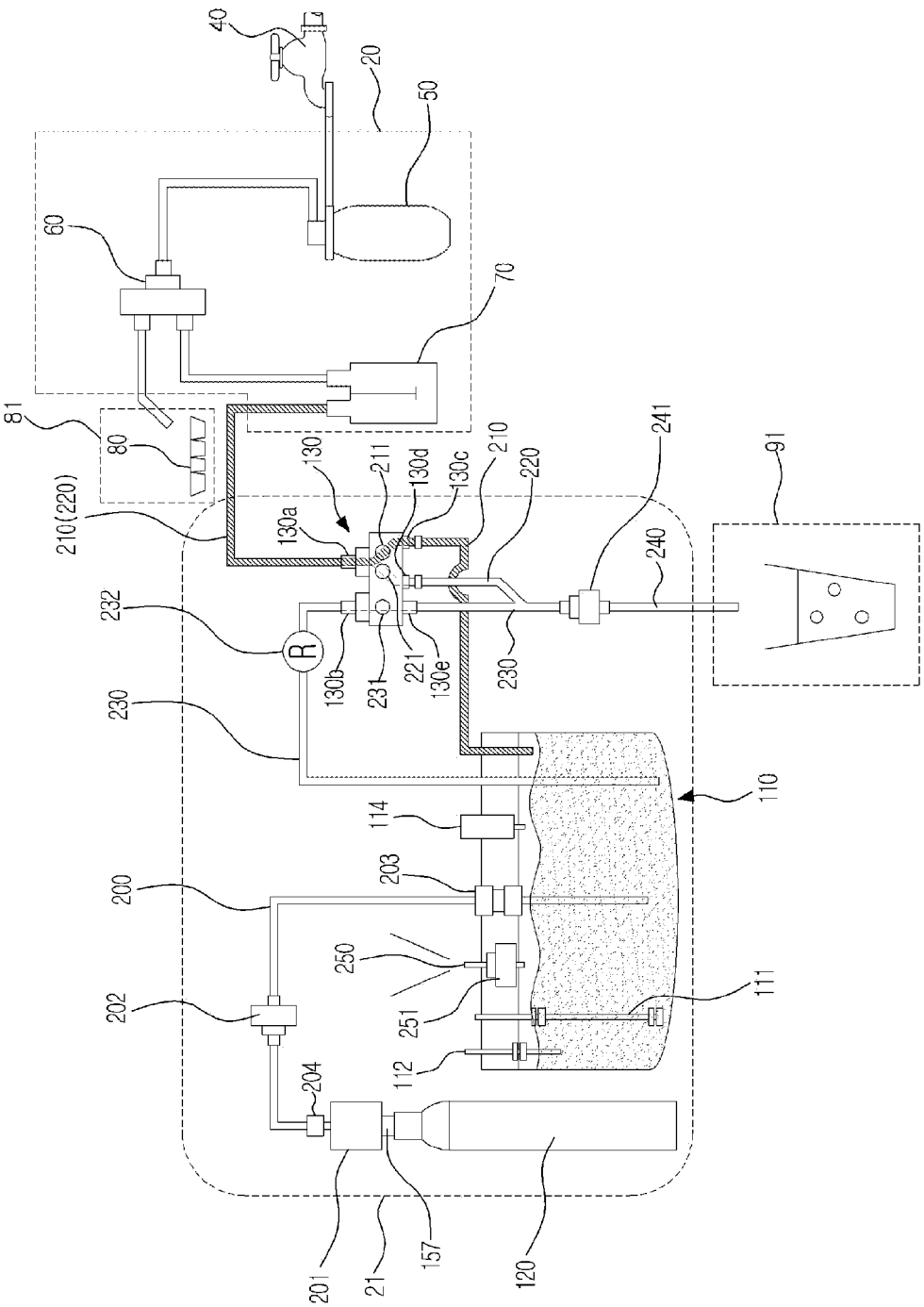
FIGS. 9A and 9B are views schematically illustrating the case that the refrigerator of FIG. 1 produces carbonated water.
Figure 9B:
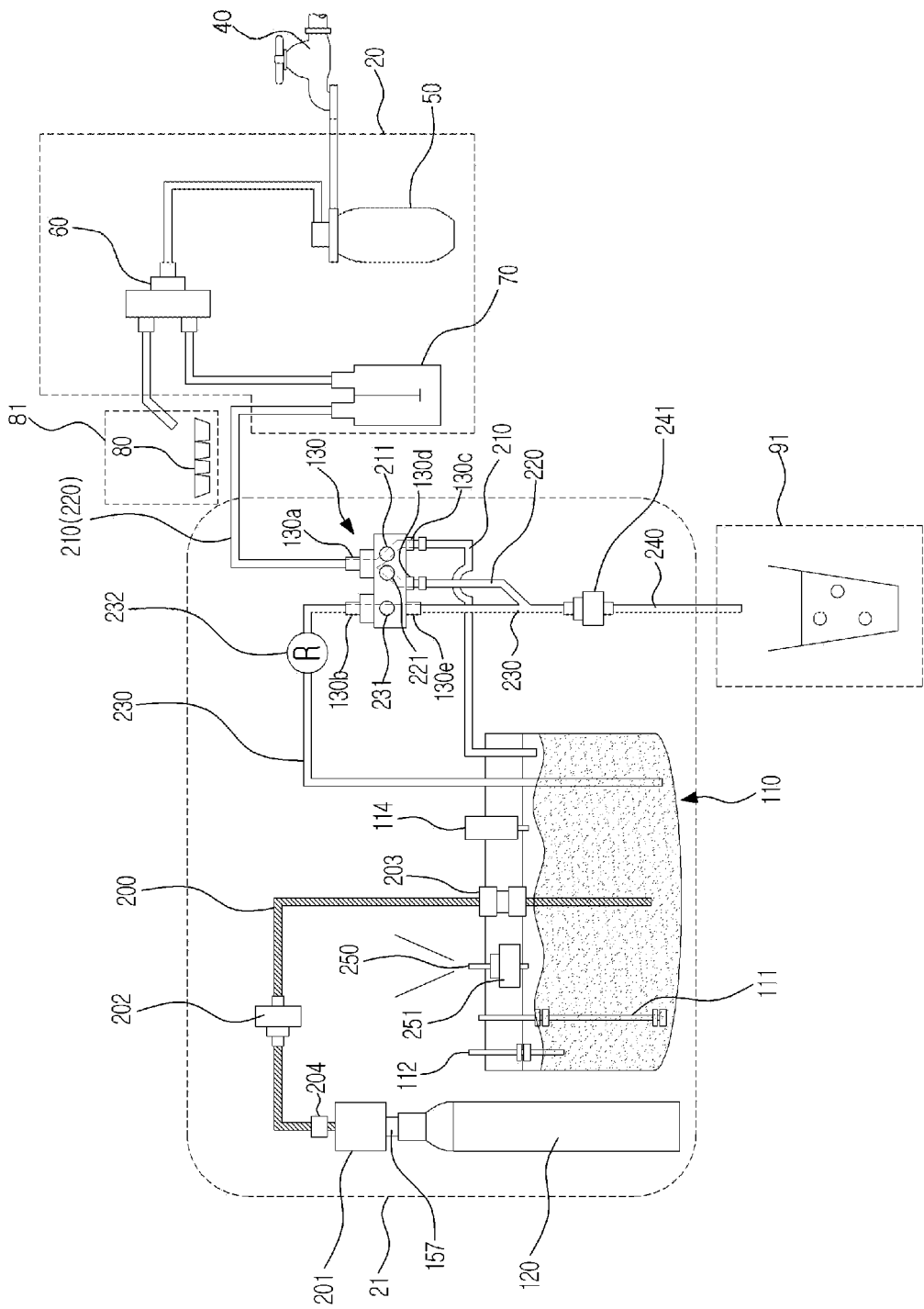

FIGS. 9A and 9B are views schematically illustrating the case that the refrigerator 1 of FIG. 1 produces carbonated water.

In briefly describing producing carbonated water using the refrigerator 1 of FIG. 1 with reference to FIGS. 9A and 9B, in order to produce carbonated water, the refrigerator 1 first supplies filtered water to the carbonated water tank 110 and then supplies carbon dioxide to the carbonated water tank 110. Subsequently, the refrigerator 1 waits for a predetermined amount of time until the supplied carbon dioxide is dissolved in the filtered water.

FIG. 9A illustrates the case that the refrigerator 1 of FIG. 1 supplies filtered water to the carbonated water tank 110, and if the refrigerator 1 opens the filtered water supply valve 211, filtered water is moved along the filtered water supply flow path 210 from the water tank 70 and is supplied to the carbonated water tank 110, as illustrated in FIG. 9A.

FIG. 9B illustrates the case that the refrigerator 1 of FIG. 1 supplies carbon dioxide to the carbonated water tank 110, and if the refrigerator 1 opens the carbon dioxide supply valve 202, carbon dioxide discharged from the carbon dioxide cylinder 120 is decompressed by the carbon dioxide regulator 201, and the decompressed carbon dioxide is moved along the carbon dioxide supply flow path 200 and is supplied to the carbonated water tank 110.

In this way, carbon dioxide supplied to the carbonated water tank 110 is dissolved in filtered water so that carbonated water can be produced.

Hereinafter, a method of producing carbonated water using the refrigerator 1 of FIG. 1 will be described in detail.

If the user inputs a carbonated water production instruction, the refrigerator 1 of FIG. 1 may produce carbonated water manually, and if a predetermined condition is satisfied, the refrigerator 1 of FIG. 1 may produce carbonated water automatically. In addition, a user may rapidly produce carbonated water by entering a rapid production instruction through the control panel (300, in FIG. 8).

Figure 10:
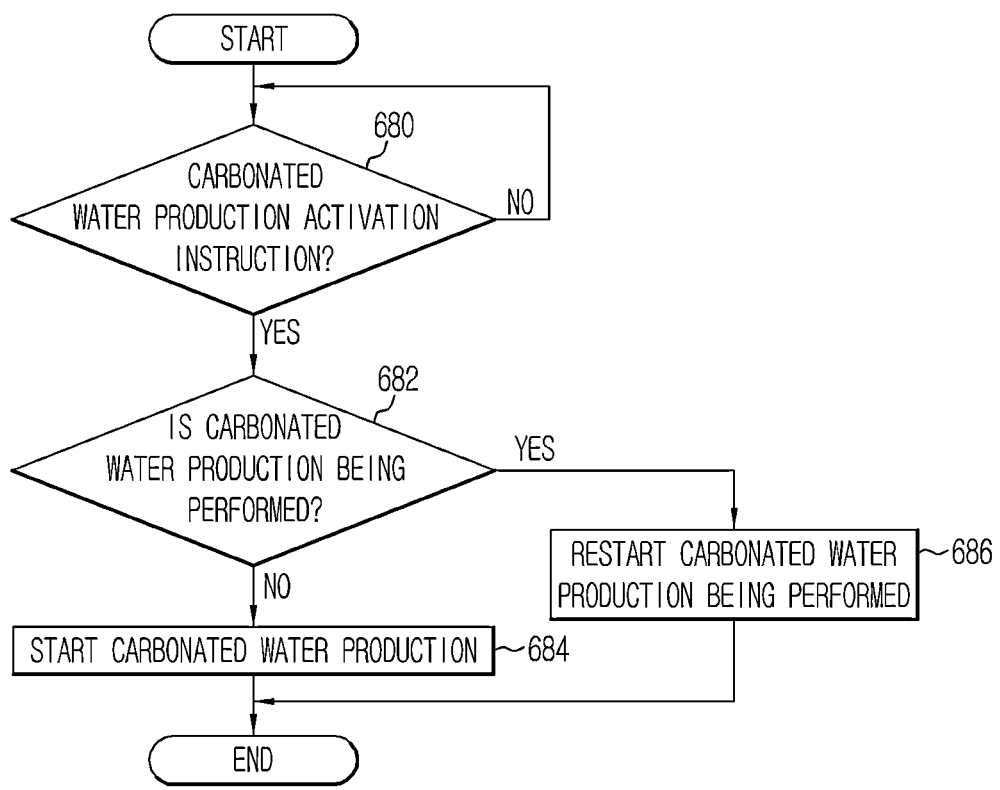
FIG. 10 is a flowchart illustrating the case that the refrigerator of FIG. 1 starts producing carbonated water in response to a user's carbonated water production instructions.

FIG. 10 is a flowchart illustrating the case that the refrigerator 1 of FIG. 1 starts producing carbonated water in response to a user's carbonated water production instructions.

Referring to FIG. 10, first, the refrigerator 1 determines whether a carbonated water production activation instruction is input from the user (680). As described above, the user may touch or press the carbonated water production instruction input unit 303 disposed in the control panel 300 for a long time, thereby inputting the carbonated water production activation instruction.

If it is determined that the carbonated water production activation instruction is input (YES of 680), the refrigerator 1 determines whether carbonated water is being produced (682). This is because, in order to produce carbonated water, when the user inputs a carbonated water production deactivation instruction in a state in which carbonated water production has been activated and then inputs the carbonated water production activation instruction, the carbonated water production activation instruction may be input when carbonated water is being produced.

If it is determined that carbonated water production is being performed (YES of 682), the refrigerator 1 restarts production of carbonated water being performed (686).

If it is determined that carbonated water production is not being performed (NO of 682), the refrigerator 1 starts production of carbonated water (684).

In this way, if the carbonated water production activation instruction is input by the user in a state in which carbonated water production has been deactivated, the refrigerator 1 starts or restarts production of carbonated water.

Figure 11:
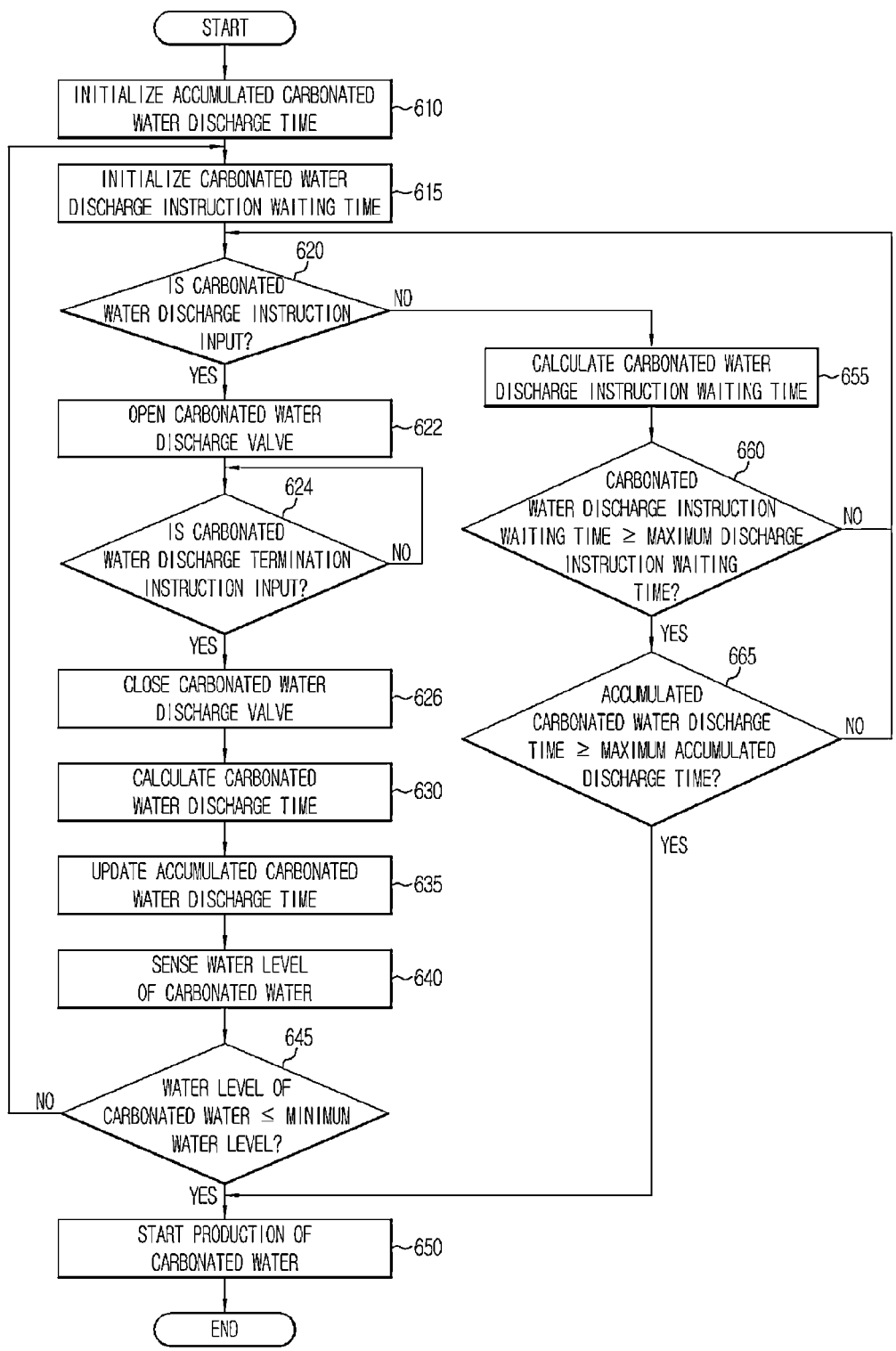
FIG. 11 is a flowchart illustrating the case that the refrigerator of FIG. 1 starts producing carbonated water by determining whether the carbonated water is produced.

FIG. 11 is a flowchart illustrating the case that the refrigerator 1 of FIG. 1 starts producing carbonated water by determining whether the carbonated water is produced.

Referring to FIG. 11, first, the refrigerator 1 initializes an accumulated carbonated water discharge time (610). The accumulated carbonated water discharge time means a total time at which the refrigerator 1 discharges carbonated water by operating the dispenser lever 93 disposed in the dispenser 90 after carbonated water has been produced. Since carbonated water is discharged by the carbonated water regulator 232 at a constant speed, the amount of carbonated water that remains in the carbonated water tank 110 can be estimated from the accumulated carbonated water discharge time.

Next, the refrigerator 1 initializes a carbonated water discharge instruction waiting time (615). The carbonated water discharge instruction waiting time means a time that elapses since carbonated water has been discharged by operating the dispenser lever 93.

Next, the refrigerator 1 determines whether a carbonated water discharge instruction is input from the user (620). As described above, the user may input the carbonated water discharge instruction by pressurizing the dispenser lever 93 disposed in the dispenser 90.

If the carbonated water discharge instruction is input from the user (YES of 620), the refrigerator 1 opens the carbonated water discharge valve 231 to discharge carbonated water (622). As described above, if the carbonated water discharge valve 231 is opened, carbonated water is discharged by pressure of the carbonated water tank 110 at a constant speed. Subsequently, the refrigerator 1 determines if a carbonated water discharge termination instruction is input (624) and closes the carbonated water discharge valve (626) when the carbonated water discharge termination instruction is input (YES of 624).

While carbonated water is discharged, the refrigerator 1 calculates a carbonated water discharge time (630). In detail, the refrigerator 1 may calculate an opening time of the carbonated water discharge valve 231 or an operating time of the dispenser lever 93, thereby calculating the carbonated water discharge time.

Subsequently, the refrigerator 1 updates an accumulated carbonated water discharge time (635). In detail, the refrigerator 1 may store the sum of the carbonated water discharge time calculated in Operation 630 and the existing accumulated carbonated water discharge time, thereby updating the accumulated carbonated water discharge time.

In this way, the refrigerator 1 may calculate the carbonated water discharge time whenever carbonated water is discharged and may update the accumulated carbonated water discharge time based on the calculated carbonated water discharge time. The refrigerator 1 may estimate a carbonated water discharge amount after carbonated water has been produced, from the calculated accumulated carbonated water discharge time and may estimate a carbonated water remaining amount that remains in the carbonated water tank 110 from the carbonated water discharge amount.

Subsequently, the refrigerator 1 senses a water level of carbonated water using the water level sensor 111 (640). In this way, the refrigerator 1 senses the water level of carbonated water when the user inputs the carbonated water discharge instruction. This is because the water level sensor 111 senses the water level of carbonated water based on a current value flowing between a plurality of electrodes, if the water level sensor 111 senses the water level of carbonated water continuously, due to a chemical reaction between carbonated water and the electrodes, bubbles are generated around the electrodes and thus an error in sensing the water level may occur. In order to prevent a malfunction of the water level sensor 111, the refrigerator 1 senses the water level of carbonated water when the user inputs the carbonated water discharge instruction.

Also, the refrigerator 1 compares the sensed water level of carbonated water with a minimum water level (645), and if the sensed water level of carbonated water is less than or equal to the minimum water level (YES of 645), the refrigerator 1 starts production of carbonated water (650). That is, the refrigerator 1 measures the amount of carbonated water that remains in the carbonated water tank 110 after carbonated water has been discharged, and if the amount of remaining carbonated water is less than a reference value, the refrigerator 1 starts production of carbonated water.

If the sensed water level of carbonated water is greater than the minimum water level (NO of 645), the refrigerator 1 goes back to Operation 615 and initializes the carbonated water discharge instruction waiting time (615). Since carbonated water has been discharged in response to the carbonated water discharge instruction, the carbonated water discharge instruction waiting time is initialized.

If the carbonated water discharge instruction is not input in Operation 620 (NO of 620), the refrigerator 1 calculates the carbonated water discharge instruction waiting time (655). Subsequently, the refrigerator 1 compares the carbonated water discharge instruction waiting time with a predetermined maximum waiting time (660). As a result of comparison, if the carbonated water discharge instruction waiting time is greater than or equal to the predetermined maximum waiting time (YES of 660), the refrigerator 1 compares the accumulated carbonated water discharge time with a predetermined maximum accumulated discharge time (665), and if the accumulated carbonated water discharge time is greater than or equal to the predetermined maximum accumulated discharge time (YES of 665), the refrigerator 1 starts production of carbonated water.

The carbonated water discharge instruction waiting time means a time that elapses since the user has input the carbonated water discharge instruction, as described above. In this way, the carbonated water discharge instruction waiting time is greater than the predetermined maximum waiting time means that the user has not used carbonated water for a long time or the user won't use carbonated water for a while. Also, the discharge amount of carbonated water and the remaining amount of carbonated water can be estimated from the accumulated carbonated water discharge time.

In this way, if it is expected that the user will not input the carbonated water discharge instruction for a while and it is determined that a predetermined amount of carbonated water has been discharged, carbonated water needs to be additionally produced. That is, in order to prevent the user from waiting for carbonated water when the water level of carbonated water is a minimum water level and carbonated water is being produced, even if the water level of carbonated water stored in the carbonated water tank 110 is not less than a minimum water level and if it is expected that the user won't use carbonated water for a while, the refrigerator 1 can produce carbonated water.

Thus, the refrigerator 1 compares the carbonated water discharge instruction waiting time with a maximum discharge instruction waiting time to determine whether there is a user's intention to drink carbonated water, compares the accumulated carbonated water discharge time with a maximum accumulated discharge time to estimate the amount of carbonated water that remains in the carbonated water tank 110, and as a result, if it is expected that the user won't input the carbonated water discharge instruction for a while and carbonated water that remains in the carbonated water tank 110 is less than a predetermined amount, the refrigerator 1 starts production of carbonated water.

If the carbonated water discharge instruction waiting time is greater than or equal to the maximum discharge instruction waiting time and the accumulated carbonated water discharge time is greater than or equal to the maximum accumulated discharge time, the refrigerator 1 of FIG. 1 starts production of carbonated water. However, aspects of the present disclosure are not limited thereto, and if the accumulated carbonated water discharge time is greater than or equal to the maximum accumulated discharge time, the refrigerator 1 can start production of carbonated water.

Figure 12:
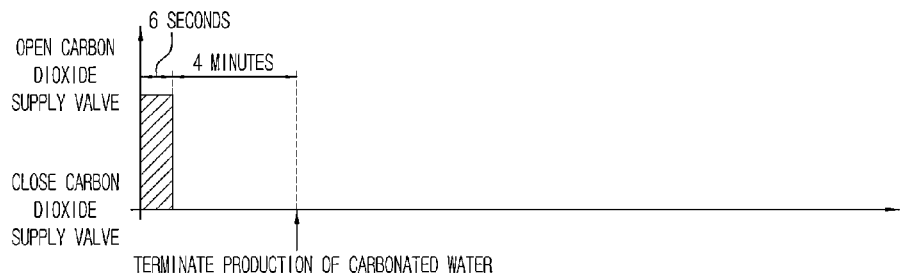
FIG. 12 is a view illustrating a method of producing carbonated water using the refrigerator of FIG. 1.
Figure 12:
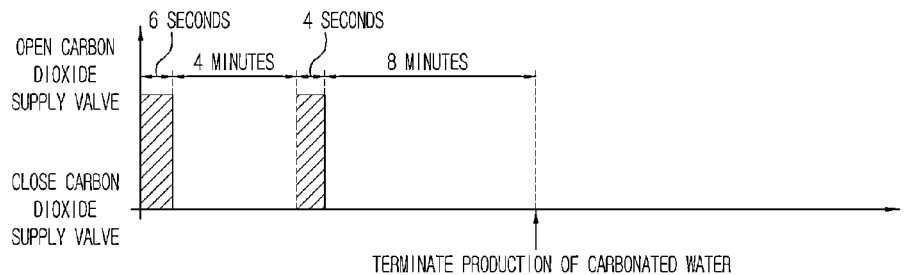
Figure 12:
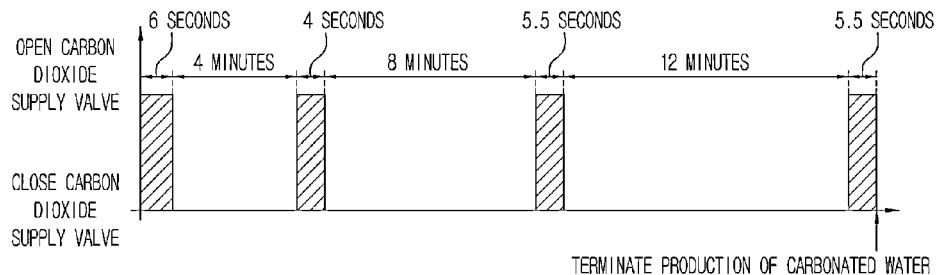

FIG. 12 is a view illustrating a method of producing carbonated water using the refrigerator 1 of FIG. 1.

Referring to FIG. 12, the refrigerator 1 of FIG. 1 can produce carbonated water having three concentrations, such as a first step, a second step, and a third step (low concentration, medium concentration, and high concentration), and the concentration of carbonated water varies according to the number of supplying carbon dioxide.

In detail, in order to produce carbonated water having the first step (low concentration), the refrigerator 1 supplies a maximum water level of filtered water to the carbonated water tank 110 and then supplies carbon dioxide to the carbonated water tank 110 during a period of first carbon dioxide supply time (for example, 6 seconds) and dissolves the supplied carbon dioxide during a period of first carbon dioxide dissolving time (for example, 4 minutes).

In addition, in order to produce carbonated water having the second step (medium concentration), the refrigerator 1 performs a process of producing carbonated water having the first step (low concentration) and then supplies carbon dioxide to the carbonated water tank 110 during a period of second carbon dioxide supply time (for example, 4 seconds) and dissolves the supplied carbon dioxide during a period of second carbon dioxide dissolving time (for example, 8 minutes).

Further, in order to produce carbonated water having the third step (high concentration), the refrigerator 1 performs a process of producing carbonated water having the second step (medium concentration) and then supplies carbon dioxide to the carbonated water tank 110 during a period of third carbon dioxide supply time (for example, 5.5 seconds), dissolves the supplied carbon dioxide during a period of third carbon dioxide dissolving time (for example, 12 minutes) and supplies carbon dioxide to the carbonated water tank 110 during a period of fourth carbon dioxide supply time (for example, 5.5 seconds).

Figure 13A:
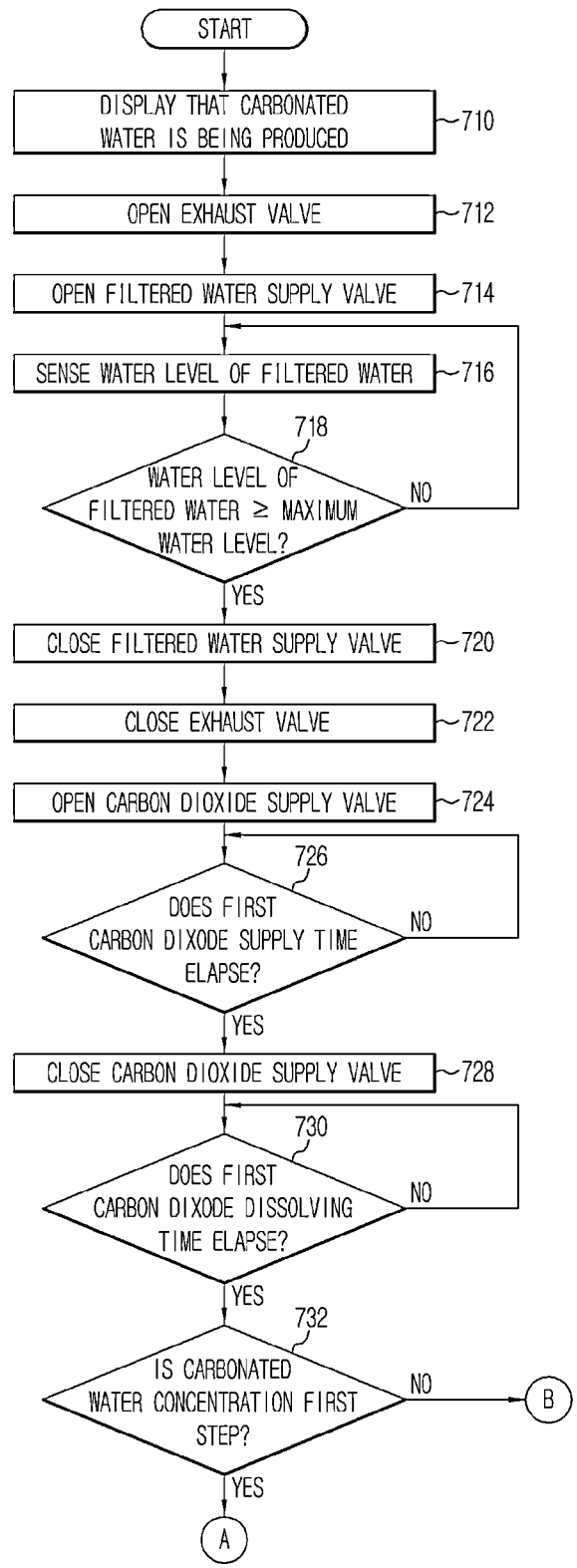
FIGS. 13A and 13B are flowcharts illustrating the method of producing carbonated water illustrated in FIG. 12.
Figure 13B:
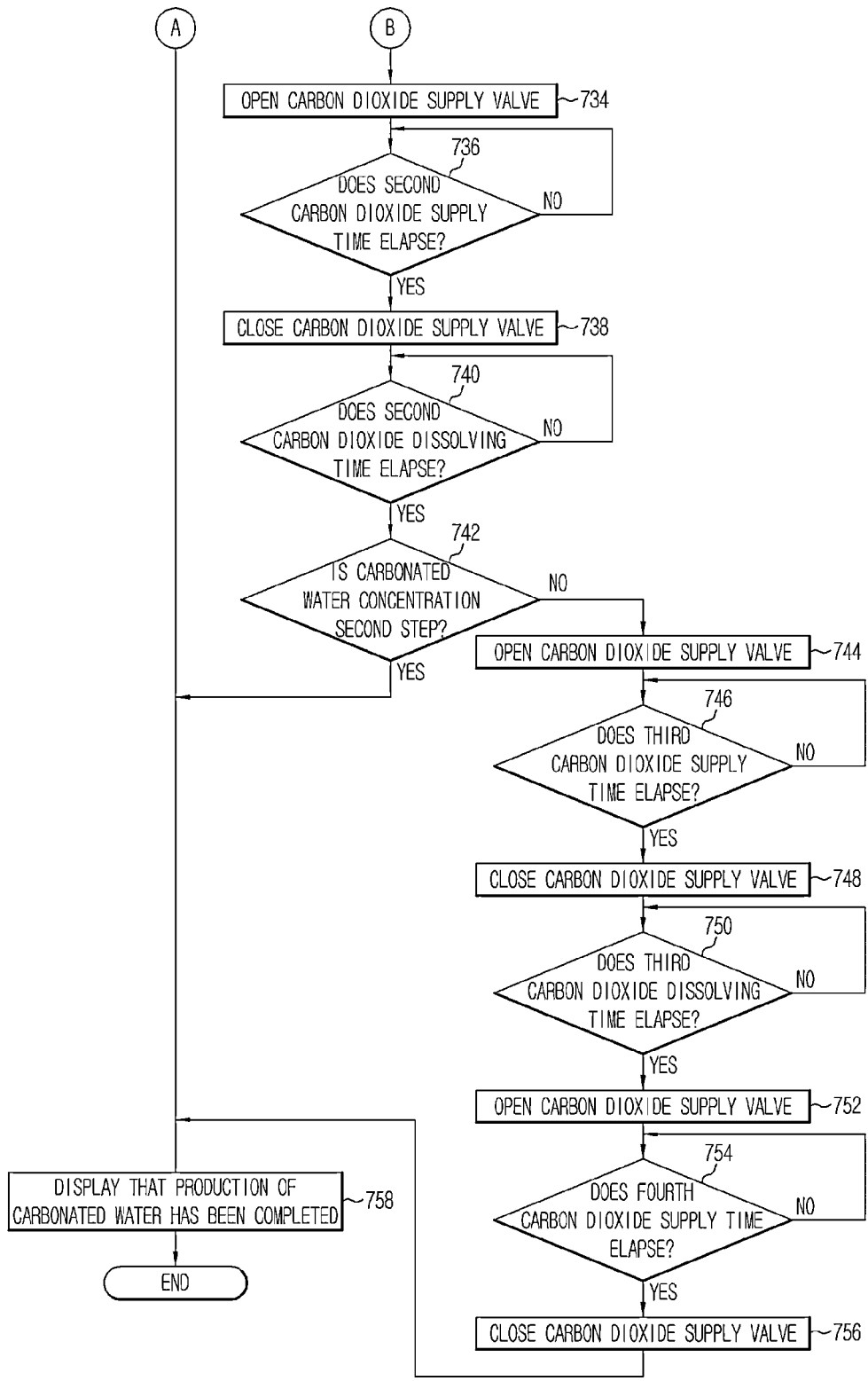

FIGS. 13A and 13B are views illustrating the method of producing carbonated water illustrated in FIG. 12.

Referring to FIGS. 13A and 13B, first, the refrigerator 1 displays that carbonated water is being produced (710). In detail, the refrigerator 1 may display that carbonated water is being produced in the carbonated water production situation display region 301c, as illustrated in (d) of FIG. 8.

Subsequently, the refrigerator 1 opens the exhaust valve 251 (712) and then opens the filtered water supply valve 211 (714). In this way, the refrigerator 1 opens the exhaust valve 251 and opens the filtered water supply valve 211 so that filtered water can be smoothly supplied to the carbonated water tank 110. In this case, the refrigerator 1 may open the filtered water supply valve 211 continuously to supply filtered water to the carbonated water tank 110.

When a solenoid valve is used as the filtered water supply valve 211, in order to prevent solenoid from being overheated, the filtered water supply valve 211 may be opened for a predetermined amount of time and then may be closed and then may be opened for a predetermined amount of time. In detail, a process of opening the filtered water supply valve 211 for 1 minute and then closing the filtered water supply valve 211 for 5 seconds may be repeatedly performed.

Subsequently, the refrigerator 1 senses a water level of filtered water through the water level sensor 111 (716), compares the sensed water level of filtered water with a predetermined maximum water level to determine whether filtered water in the carbonated water tank 110 reaches the maximum water level (718).

If it is determined that filtered water in the carbonated water tank 110 reaches the maximum water level (YES of 718), the refrigerator 1 closes the filtered water supply valve 211 (720) and closes the exhaust valve 251 (722).

Subsequently, the refrigerator 1 opens the carbon dioxide supply valve 202 (724), then determines whether a first carbon dioxide supply time (for example, 6 seconds) elapses (726), and if it determined that the first carbon dioxide supply time (for example, 6 seconds) elapses, the refrigerator 1 closes the carbon dioxide supply valve 202 (728). In this manner, the refrigerator 1 allows carbon dioxide to be supplied to the carbonated water tank 110 during a period of the first carbon dioxide supply time (for example, 6 seconds).

Subsequently, the refrigerator 1 waits during a period of first carbon dioxide dissolving time (for example, 4 minutes) (730). That is, the refrigerator 1 allows carbon dioxide supplied to the carbonated water tank 110 to be sufficiently dissolved in filtered water.

Subsequently, the refrigerator 1 determines whether the concentration of carbonated water selected by the user is "first step (low concentration)" (732).

If the concentration of carbonated water selected by the user through the control panel 300 is the first step (low concentration) (YES of 732), the refrigerator 1 displays that production of carbonated water has been completed (758) and terminates production of carbonated water.

If the concentration of carbonated water selected by the user is not the first step (low concentration) (NO of 732), the refrigerator 1 opens the carbon dioxide supply valve 202 (734) and determines whether a second carbon dioxide supply time (for example, 4 seconds) that elapses since the carbon dioxide supply valve 202 has been opened (736), and if it is determined that the second carbon dioxide supply time (for example, 4 seconds) elapses (YES of 736), the refrigerator 1 closes the carbon dioxide supply valve 202 (738). In this manner, the refrigerator 1 supplies carbon dioxide to the carbonated water tank 110 during a period of the second carbon dioxide supply time (for example, 4 seconds).

Subsequently, the refrigerator 1 waits during a period of second carbon dioxide dissolving time (for example, 8 minutes) (740). That is, the refrigerator 1 allows carbon dioxide supplied to the carbonated water tank 110 to be sufficiently dissolved in filtered water.

Subsequently, the refrigerator 1 determines whether the concentration of carbonated water selected by the user is "second step (medium concentration)" (742).

If it is determined that the concentration of carbonated water selected by the user is the second step (medium concentration) (YES of 742), the refrigerator 1 displays that production of carbonated water has been completed (758) and terminates production of carbonated water.

If it is determined that the concentration of carbonated water selected by the user is not the second step (medium concentration) (NO of 742), the refrigerator 1 opens the carbon dioxide supply valve 202 (744) and determines whether a third carbon dioxide supply time (for example, 5.5 seconds) elapses (746) since the carbon dioxide supply valve 202 has been opened, and if it is determined that the third carbon dioxide supply time (for example, 5.5 seconds) elapses (YES of 746), the refrigerator 1 closes the carbon dioxide supply valve 202 (748). In this manner, the refrigerator 1 supplies carbon dioxide to the carbonated water tank 110 during a period of the third carbon dioxide supply time (for example, 5.5 seconds).

Subsequently, the refrigerator 1 waits during a period of third carbon dioxide dissolving time (for example, 12 minutes) (750). That is, the refrigerator 1 allows carbon dioxide supplied to the carbonated water tank 110 to be sufficiently dissolved in filtered water.

Subsequently, the refrigerator 1 opens the carbon dioxide supply valve 202 (752) and determines whether a fourth carbon dioxide supply time (for example, 5.5 seconds) elapses (754) since the carbon dioxide supply valve 202 has been opened, and if it is determined that the fourth carbon dioxide supply time (for example, 5.5 seconds) elapses (YES of 754), the refrigerator 1 closes the carbon dioxide supply valve 202 (756). In this manner, the refrigerator 1 supplies carbon dioxide to the carbonated water tank 110 during a period of the fourth carbon dioxide supply time (for example, 5.5 seconds).

Subsequently, the refrigerator 1 displays that production of carbonated water has been completed (758) and terminates production of carbonated water.

Although the refrigerator 1 of FIG. 1, if a predetermined carbonated water production starting condition is satisfied, produces carbonated water without considering the temperature of filtered water when producing carbonated water, the present disclosure is not limited thereto. According to another embodiment, carbonated water may be produced in consideration of the temperature of filtered water since solubility of gas with respect to liquid increases as the temperature of liquid is lowered. For example, the refrigerator 1 of FIG. 1 measures the temperature of filtered water stored in the carbonated water tank 110 since filtered water has been supplied to the carbonated water tank 110, and if the temperature of filtered water stored in the carbonated water tank 110 is higher than or equal to a predetermined temperature, the refrigerator 1 delays supply of carbon dioxide. As described above, since the carbonated water tank 110 is disposed in the refrigerator compartment 20, the temperature of filtered water stored in the carbonated water tank 110 is lowered over time. Thus, if the measured temperature of filtered water is lower than or equal to the predetermined temperature, the refrigerator 1 may supply carbon dioxide to produce carbonated water.

In this case using the above method, the refrigerator 1 may produce carbonated water by use of as much carbon dioxide as possible stored in the carbon dioxide cylinder 120, but there is a need to wait for the carbon dioxide to dissolve into the filtered water, causing a great amount of time in producing carbonated water. If a user additionally desires to use carbonated water after completely consuming the carbonated water in the carbonated water tank 110, the user needs to wait for a great amount of time until the carbonated water is completed. For this reason, the refrigerator 1 needs to perform a rapid production of carbonated water.

Figure 14:
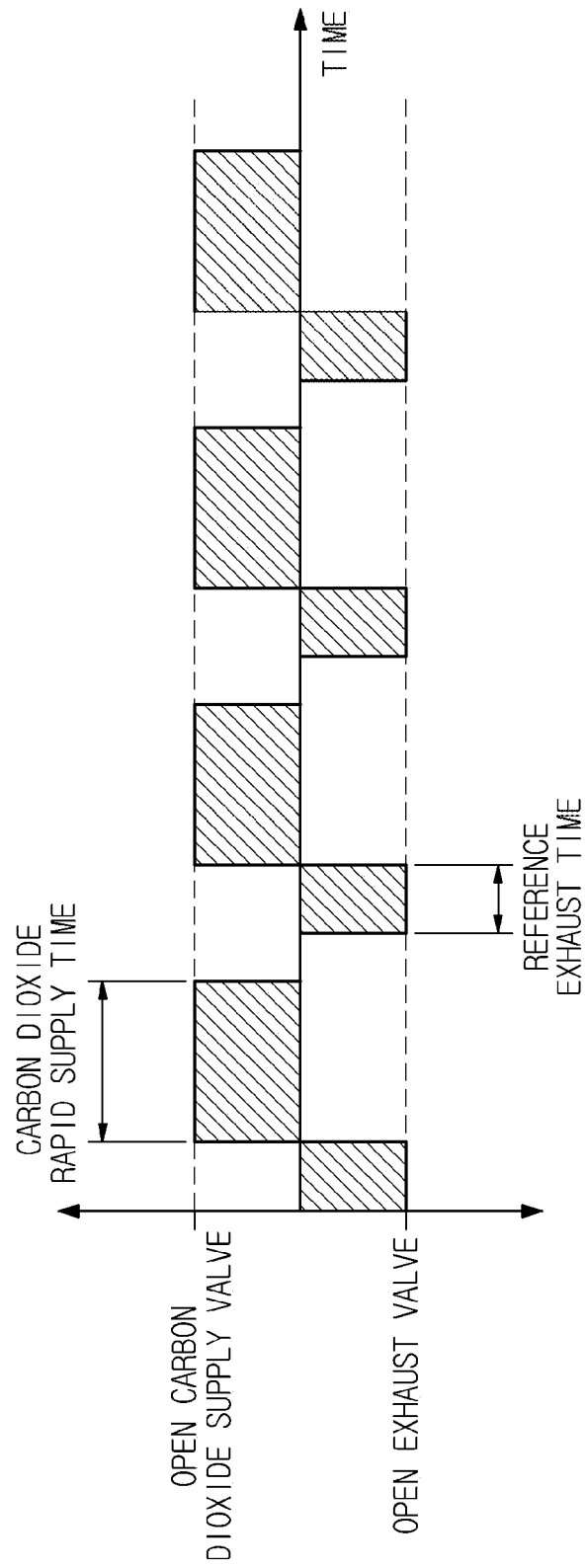
FIG. 14 is a view illustrating a method of rapidly producing carbonated water in a refrigerator according to an embodiment of the present disclosure.

FIG. 14 is a view illustrating a method of rapidly producing carbonated water in a refrigerator according to an embodiment of the present disclosure.

Referring to FIG. 14, the refrigerator 1 supplies filtered water up to a maximum water level of the carbonated water tank 110, and repeats opening of the exhaust valve 251 configured to discharge carbon dioxide remaining in the carbonated water tank 110 as well as opening of the carbon dioxide supply valve 202 configured to supply carbon dioxide to the carbonated water tank 110. As the supply and discharge of the carbon dioxide is repeated, the carbonated water is rapidly produced.

In detail, the carbon dioxide supply flow path 200 (see FIG. 5) extends deeply to the inside of the carbonated water tank 110, and if carbon dioxide is supplied, air bubbles are generated in the filtered water in the carbonated water tank 110, thereby stirring carbon dioxide and filtered water. In addition, the more carbon dioxide is supplied, the more dissolving between the filtered water and the carbon dioxide occurs, and thus carbon dioxide rapidly dissolves into the filtered water. As such, the increase in amount of carbon dioxide passing through the filtered water allows the carbon dioxide to be rapidly produced.

In order to increase the amount of carbon dioxide passing through the filtered water, the refrigerator 1 supplies carbon dioxide to the carbonated water tank 110 after reducing pressure inside the carbonated water tank 110. Since carbon dioxide is supplied to the carbonated water tank 110 at a constant pressure (for example, 8.5 bar) due to the carbon dioxide regulator 201, the decrease in the internal pressure of the carbonated water tank 110 allows a larger amount of carbon dioxide to be supplied to the carbonated water tank 110.

In addition, the refrigerator 1 opens the exhaust valve 251 to lower the pressure inside the carbonated water tank 110. That is, the refrigerator 1, by opening the exhaust valve 251, discharges carbon dioxide remaining inside the carbonated water tank 110, and thus reduces the pressure inside the carbonated water tank 110.

Subsequently, in order to supply carbon dioxide to the carbonated water tank 110, the carbon dioxide supply valve 202 opens. If the carbon dioxide is supplied after the pressure inside the carbonated water tank 110 is reduced, a great amount of carbon dioxide passes through the filtered water, and thus a great amount of carbon dioxide dissolves into the filtered water.

By repeating the supply and discharge of the carbon dioxide to/from the carbonated water tank 110, the refrigerator 1 can rapidly produce the carbonated water.

Figure 15A:
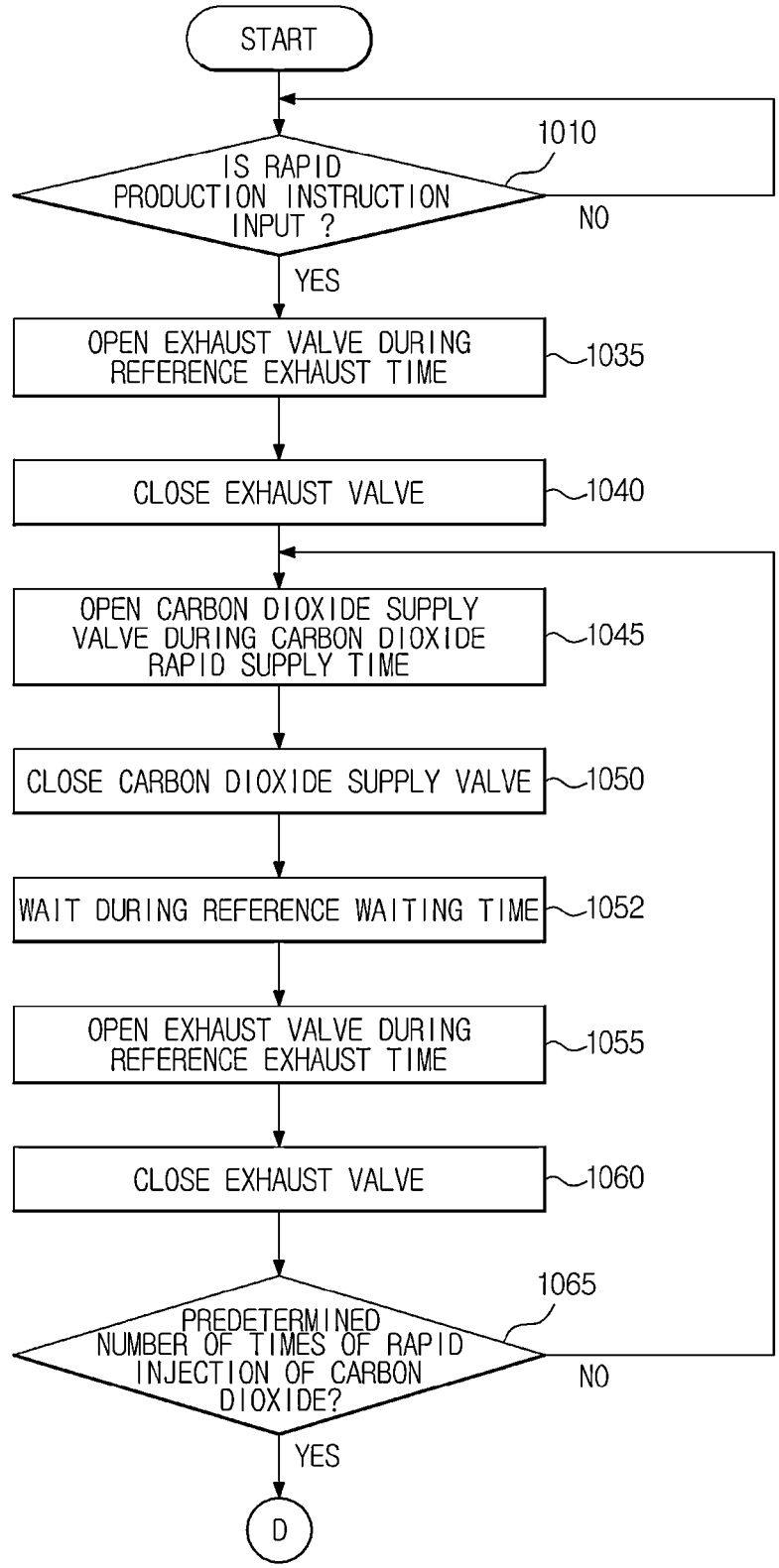
FIG. 15A and FIG. 15B are flowcharts illustrating the method of rapidly producing carbonated water of FIG. 14.
Figure 15B:
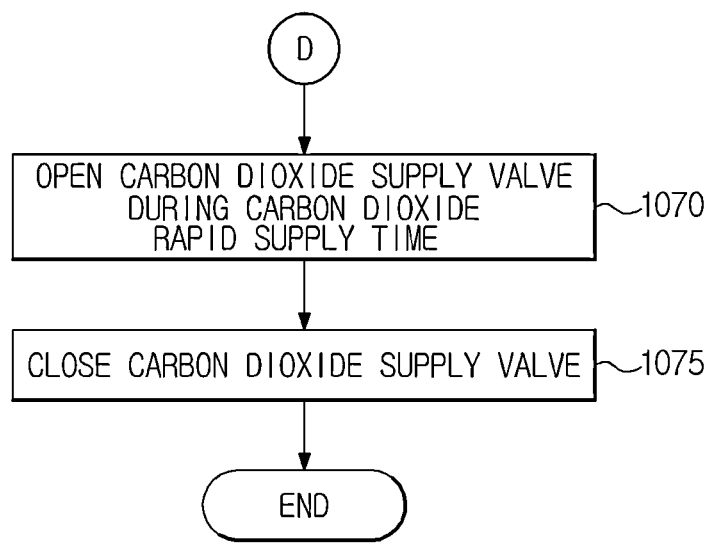

FIG. 15A and FIG. 15B are flowcharts illustrating the method of rapidly producing carbonated water of FIG. 14.

Referring to FIGS. 15A and 15B, a method of rapidly producing carbonated water will be described in detail. First, the refrigerator 1 determines whether or not a rapid production instruction is input (1010). A user may enter the rapid production instruction through the rapid production instruction input unit (307 in FIG. 7) of the control panel 300.

If the rapid production instruction is input (YES from operation 1010), the refrigerator 1 displays rapid production of carbonated water (1015). In detail, the refrigerator 1 may display the rapid production of carbonated water, through the rapid production information display unit (309 in FIG. 7) of the control panel 300. Such a rapid production instruction may be input not only when the carbonated water is not being produced but also when the carbonated water is being produced. If a rapid production instruction is input when the carbonated water is not being produced, the refrigerator 1 opens the exhaust valve 251 to supply filtered water up to a maximum level of the carbonated water tank 110, and then closes the exhaust valve 251. That is, the refrigerator 1, after supplying the filtered water up to the maximum level of the carbonated water tank 100, starts producing carbonated water. Meanwhile, if a rapid production instruction is input when the carbonated water is being produced, the refrigerator 1 stops producing the carbonated water, and instantly starts rapid production.

Subsequently, the refrigerator 1 opens the exhaust valve 251 during a reference exhaust time (1035), and closes the exhaust valve 251 (1040). In this case, the reference exhaust time may be set to about 0.5 secs to about 5 secs, and the reference exhaust time may vary depending on the capacity of the carbonated water tank 110 or the supply pressure of carbon dioxide, that is, a discharge pressure of the carbon dioxide regulator 201. In this manner, the exhaust valve 251 is open as the above before supply of carbon dioxide to discharge carbon dioxide inside the carbonated water tank 110 in case that a rapid production instruction is input during the production of carbonated water. That is, carbon dioxide may remain at a high pressure in the carbonated water tank 110 when a rapid production instruction is input during the production of carbonated water, and the carbon dioxide is discharged so that the pressure inside the carbonated water tank 110 is reduced.

Subsequently, the refrigerator 1 opens the carbon dioxide supply valve 202 during a carbon dioxide rapid supply time (1045), and closes the carbon dioxide supply valve 202 (1050). The carbon dioxide rapid supply time may be set to about 0.5 secs to about 10 secs, and may vary depending on the capacity of the carbonated water tank 110 or the supply pressure of carbon dioxide, that is, a discharge pressure of the carbon dioxide regulator 201. In this manner, if the carbon dioxide is supplied to the carbonate water tank 110 after the pressure inside the carbonated water tank 110 is reduced, a great amount of carbon dioxide is supplied to the carbonated water tank 110 as described above, and the carbon dioxide and the filtered water are stirred during the supply of great amount of carbon dioxide, thereby easily dissolving the carbon dioxide in the filtered water.

Subsequently, the refrigerator 1 may wait for a predetermined reference waiting time (1052), which represents a waiting operation until carbon dioxide supplied to the carbonated water tank 110 is dissolved in the filtered water. Such a reference waiting time may be set to about 1 sec to about 10 secs, and may vary depending on the capacity of the carbonated water tank 110 or the supply pressure of carbon dioxide, that is, a discharge pressure of the carbon dioxide regulator 201.

Subsequently, the refrigerator 1 opens the exhaust valve 251 again during a reference exhaust time (1055), and then closes the exhaust valve 251 (1060). Accordingly, carbon dioxide supplied in operation 1045 and remaining in the carbonated water tank 110 without being dissolved in the filtered water during the reference waiting time is discharged. As the residual carbon dioxide is discharged, the refrigerator 1 lowers the pressure inside the carbonated water tank 110.

Subsequently, the refrigerator 1 determines whether the number of times of carbon dioxide supply reaches a predetermined number of times of carbon dioxide rapid injection (1065). The supplying of carbon dioxide at a low pressure inside the carbonated tank 110 as described above enables a great amount of carbon dioxide to be dissolved in the filtered water, but in order to produce a desirable density of carbonated water, the supply of carbon dioxide needs to be repeated a plurality of number of times. That is, the number of times of carbon dioxide rapid injection may be set to be different depending to a desired density of the carbonated water. For example, in a case when a user instructs carbonated water be produced at a first level or a low density of carbonated water, the refrigerator 1 may set the predetermined number of times of carbon dioxide rapid injection to one time to two times, and if a case when a user instructs carbonated water be produced at a second level or a medium density of carbonated water, the refrigerator 1 may set the predetermined number of times of carbon dioxide rapid injection to three times to four times. In addition, if a case when a user instructs carbonated water be produced at a third level or a high density of carbonated water, the refrigerator 1 may set the predetermined number of times of carbon dioxide rapid injection to five times or more.

If the number of times of carbon dioxide supply does not reach the predetermined number of times of carbon dioxide rapid injection (NO from operation 1065), the refrigerator 1 repeats the supply and discharge of carbon dioxide into/from the carbonated water tank 110.

If the number of times of carbon dioxide supply reaches the predetermined number of times of carbon dioxide rapid injection (YES from operation 1065), the refrigerator 1 opens the carbon dioxide supply valve 202 during a carbon dioxide rapid supply time (1070), and closes the carbon dioxide supply valve 202 (1075). In this case, the supply of carbon dioxide is performed to dissolve the carbon dioxide into the filtered water while maintaining the pressure inside the carbonated water tank 110 at a constant level. That is, the supply of carbon dioxide is performed such that the refrigerator 1 discharges carbonated water by use of pressure inside the carbonated water tank 110 when a user enters a carbonated water discharge instruction through the dispenser lever 93.

In this manner, by repeating the supply and discharge of the carbon dioxide into/from the carbonated water tank 110, the refrigerator 1 rapidly produces the carbonated water, for example, within a few minutes.

Hereinafter, in case of an exceptional situation like the case that the user inputs a filtered water discharge instruction or the case that the user opens the refrigerator compartment doors 21 and 22 when carbonated water is being produced, an operation of the refrigerator 1 will be described.

When carbonated water is being produced, in particular, when filtered water is being supplied to the carbonated water tank 110, if the user pressurizes the dispenser lever 93 to input a filtered water discharge instruction, the refrigerator 1 stops supplying filtered water to the carbonated water tank 110 and discharges filtered water to the outside through the dispenser 90.

Filtered water supplied to the carbonated water tank 110 and filtered water discharged to the outside through the dispenser 90 are supplied to the water tank 70, and a water pressure of filtered water when the water tank 70 supplies filtered water is limited. Thus, if the water tank 70 supplies filtered water to the carbonated water tank 110 and simultaneously discharges filtered water through the dispenser 90, the water pressure of filtered water discharged through the dispenser 90 may be lowered. In this way, if the water pressure of filtered water discharged through the dispenser 90 is lowered, the user may misunderstand that the refrigerator 1 is broken.

In this way, in order to prevent the water pressure of filtered water discharged through the dispenser 90 from being lowered, if the user inputs a filtered water discharge instruction when filtered water is being supplied to the carbonated water tank 110, the refrigerator 1 stops supplying filtered water to the carbonated water tank 110 and discharges filtered water through the dispenser 90. Subsequently, if the user inputs the filtered water discharge termination instruction, the refrigerator 1 stops discharging filtered water through the dispenser 90 and supplies filtered water to the carbonated water tank 110.

In addition, if the user opens the refrigerator compartment doors 21 and 22 when carbonated water is being produced, the refrigerator 1 stops production of carbonated water. That is, if the user opens the refrigerator compartment doors 21 and 22 when filtered water is being supplied to the carbonated water tank 110, the refrigerator 1 stops supplying filtered water to the carbonated water tank 110, and if the user opens the refrigerator compartment doors 21 and 22 in which the carbonated water production module 100 is disposed, when carbon dioxide is being supplied to the carbonated water tank 110, even if a condition for supplying carbon dioxide to the carbonated water tank 110 is satisfied, the refrigerator 1 delays supply of carbon dioxide until the user closes the refrigerator compartment doors 21 and 22. Also, the refrigerator 1 stops supplying carbon dioxide to the carbonated water tank 110. Since the water tank 70 supplies filtered water to the carbonated water tank 110 under a high water pressure and the carbon dioxide cylinder 120 supplies carbon dioxide to the carbonated water tank 110 under a high pressure, a noise may be generated in a process of producing carbonated water. In this way, when the user opens the refrigerator compartment doors 21 and 22, an unpleasant feeling may be given to the user, and furthermore, the user may misunderstand that the refrigerator 1 is broken.

In this way, in order to prevent a noise from being generated in the carbonated water production module 100 when the user opens the refrigerator compartment doors 21 and 22, the refrigerator 1 stores the process of producing carbonated water and then stops production of carbonated water. If the user closes the refrigerator compartment doors 21 and 22, the refrigerator 1 continues to produce carbonated water.

Figure 16A:
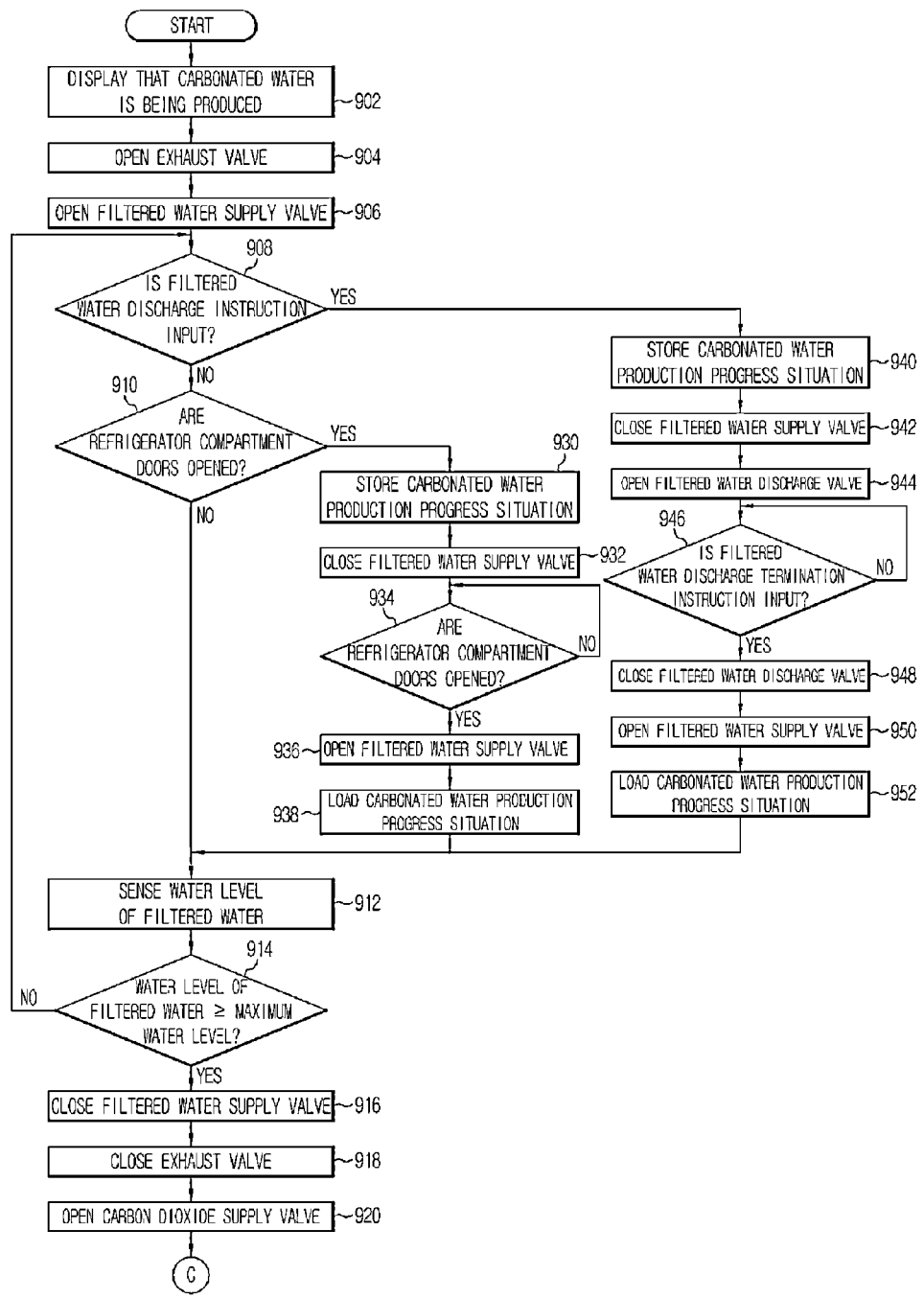
FIGS. 16A and 16B are flowcharts illustrating control of the refrigerator of FIG. 1 when an exceptional situation occurs during carbonated water production.
Figure 16B:
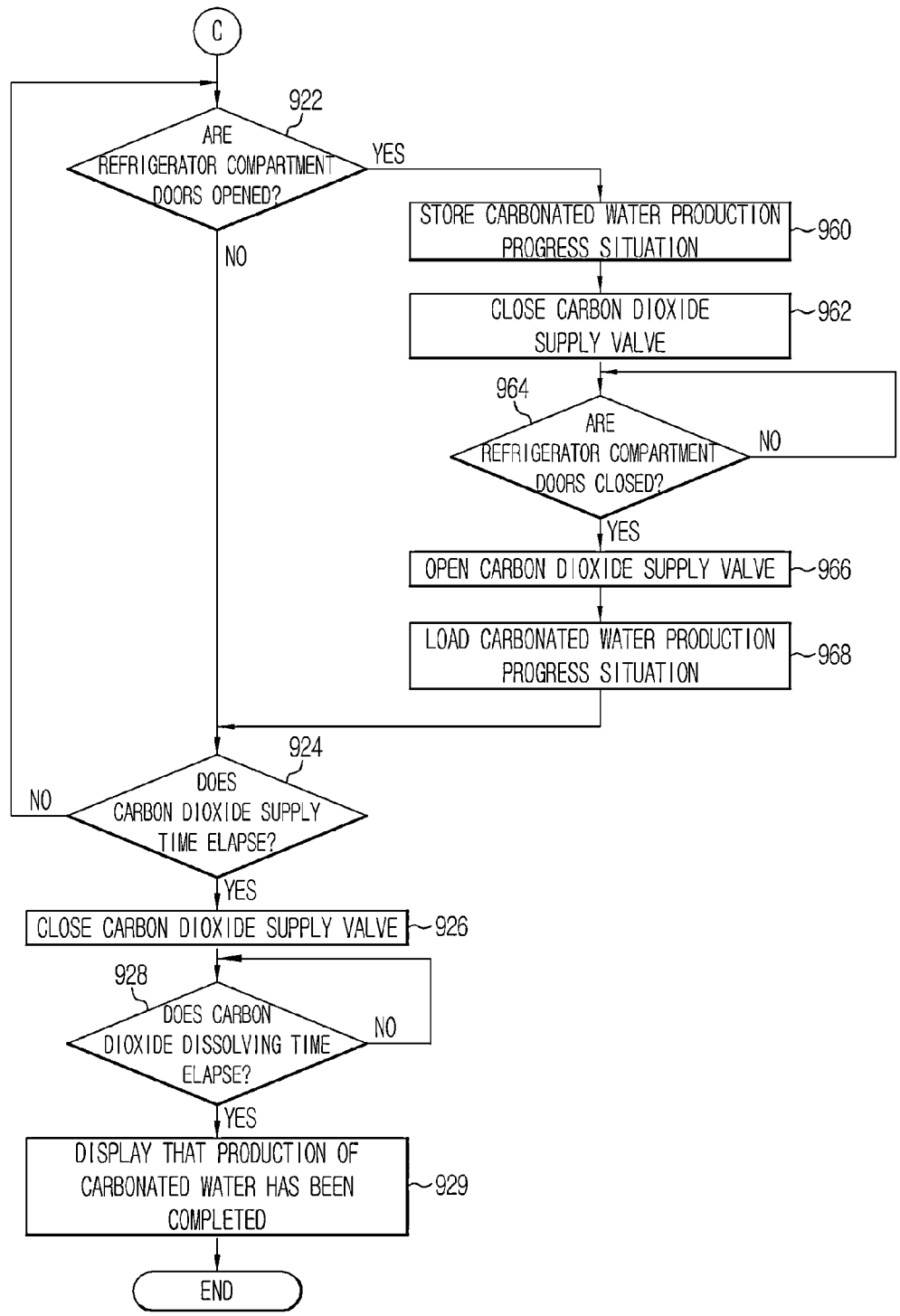

FIGS. 16A and 16B are flowcharts illustrating control of the refrigerator 1 of FIG. 1 when an exceptional situation occurs during carbonated water production.

Referring to FIGS. 16A and 16B, first, the refrigerator 1 displays production of carbonated water on the control panel 300 (902).

Subsequently, the refrigerator 1 opens the exhaust valve 251 (904), opens the filtered water supply valve 211 (906), thereby supplying filtered water to the carbonated water tank 110.

When filtered water is being supplied to the carbonated water tank 110, the refrigerator 1 determines whether the filtered water discharge instruction is input (908). That is, the refrigerator 1 determines whether the user pressurizes the dispenser lever 93 disposed in the dispenser 90.

If it is determined that the user inputs the filtered water discharge instruction (YES of 908), the refrigerator 1 stores a situation in which carbonated water is being produced (940).

Subsequently, the refrigerator 1 closes the filtered water supply valve 211 (942) to stop supplying filtered water to the carbonated water tank 110, and the refrigerator 1 opens the filtered water discharge valve 221 (944) to discharge filtered water to the outside.

When filtered water is being discharged to the outside, the refrigerator 1 determines whether a filtered water discharge termination instruction is input (946). That is, the refrigerator 1 determines whether the user stops pressurizing the dispenser lever 93 disposed in the dispenser 90.

If it is determined that the user inputs the filtered water discharge termination instruction (YES of 946), the refrigerator 1 closes the filtered water discharge valve 221 (948) to stop discharging filtered water to the outside, and the refrigerator 1 opens the filtered water supply valve 211 (950) to restart production of carbonated water and load a carbonated water production progress situation (952).

If it is determined that the user does not input the filtered water discharge instruction (NO of 908), the refrigerator 1 determines whether the refrigerator compartment doors 21 and 22 are opened (910).

If it is determined that the user opens the refrigerator compartment doors 21 and 22 (YES of 910), the refrigerator 1 stores a situation in which carbonated water is being produced (930).

Subsequently, the refrigerator 1 closes the filtered water supply valve 211 (932) to stop production of carbonated water.

Subsequently, the refrigerator 1 determines whether the refrigerator compartment doors 21 and 22 are closed (934).

If it is determined that the refrigerator compartment doors 21 and 22 are closed (YES of 934), the refrigerator 1 opens the filtered water supply valve 211 (936) to restart production of carbonated water and load a carbonated water production progress situation (938).

If the user does not open the refrigerator compartment doors 21 and 22 (NO of 910), the refrigerator 1 senses a water level of filtered water in the carbonated water tank 110 (912).

Subsequently, the refrigerator 1 determines whether the water level of filtered water in the carbonated water tank 110 reaches a maximum water level (914).

If it is determined that the water level of filtered water in the carbonated water tank 110 does not reach the maximum water level (NO of 914), the refrigerator 1 repeatedly determines whether the filtered water discharge instruction is input, whether the refrigerator compartment doors 21 and 22 are opened, and whether the water level of filtered water in the carbonated water tank 110 reaches the maximum water level.

If it is determined that the water level of filtered water in the carbonated water tank 110 reaches the maximum water level (YES of 914), the refrigerator 1 closes the filtered water supply valve 211 (916) and closes the exhaust valve 251 (918), thereby terminating supply of filtered water to the carbonated water tank 110.

Subsequently, the refrigerator 1 opens the carbon dioxide supply valve 202 (920), thereby supplying carbon dioxide to the carbonated water tank 110.

When carbon dioxide is being supplied to the carbonated water tank 110, the refrigerator 1 determines whether the refrigerator compartment doors 21 and 22 are opened (922).

If it is determined that the refrigerator compartment doors 21 and 22 are opened (YES of 922), the refrigerator 1 stores a situation in which carbonated water is being produced (960).

Subsequently, the refrigerator 1 closes the carbon dioxide supply valve 202 (962), thereby stopping production of carbonated water.

Subsequently, the refrigerator 1 determines whether the refrigerator compartment doors 21 and 22 are closed (964).

If it is determined that the refrigerator compartment doors 21 and 22 are closed (YES of 964), the refrigerator 1 opens the carbon dioxide supply valve 202 (966) to restart production of carbonated water and load a carbonated water production progress situation (968).

If it is determined that the refrigerator compartment doors 21 and 22 are not opened (NO of 922), the refrigerator 1 determines whether a carbon dioxide supply time elapses (924).

If it is determined that the carbon dioxide supply time does not elapse, the refrigerator 1 repeatedly determines whether the refrigerator compartment doors 21 and 22 are opened and whether the carbon dioxide supply time elapses.

If it is determined that the carbon dioxide supply time elapses, the refrigerator 1 closes the carbon dioxide supply valve 202 (926).

Subsequently, the refrigerator 1 determines whether a carbon dioxide dissolving time elapses (928).

If it is determined that the carbon dioxide dissolving time elapses, the refrigerator 1 displays that production of carbonated water has been completed on the control panel 300 (929).

As described above, producing carbonated water using the refrigerator 1 of FIG. 1 has been described.

Hereinafter, managing produced carbonated water since the refrigerator 1 of FIG. 1 has produced carbonated water will be described.

As described above, the refrigerator 1 of FIG. 1 discharges carbonated water to the outside using the pressure of carbon dioxide supplied to the carbonated water tank 110. Thus, the pressure of carbon dioxide in the carbonated water tank 110 needs to be maintained at a predetermined value or more. If the pressure of carbon dioxide in the carbonated water tank 110 is not maintained at the predetermined value or more, the water pressure of carbonated water discharged by the refrigerator 1 is lowered, and the user may misunderstand that the refrigerator 1 is broken.

However, as time elapses since carbonated water has been produced, carbon dioxide is dissolved in filtered water, and the pressure of carbon dioxide in the carbonated water tank 110 is gradually decreased. Thus, if a predetermined condition for maintaining the pressure of carbon dioxide in the carbonated water tank 110 is satisfied, carbon dioxide needs to be supplied to the carbonated water tank 110.

There are three main causes of a reduction in the pressure of carbon dioxide in the carbonated water tank 110.

The first cause of the reduction in the pressure of carbon dioxide in the carbonated water tank 110 is that the temperature of carbonated water is lowered. Solubility of gas with respect to liquid is increased as the temperature of liquid is lowered. As the temperature of carbonated water is lowered, the amount of carbon dioxide dissolved in filtered water increases. Thus, as the temperature of carbonated water is lowered, the pressure of carbon dioxide in the carbonated water tank 110 is decreased. Thus, if the temperature of carbonated water in the carbonated water tank 110 is lowered, the refrigerator 1 supplies carbon dioxide to the carbonated water tank 110.

Figure 17A:
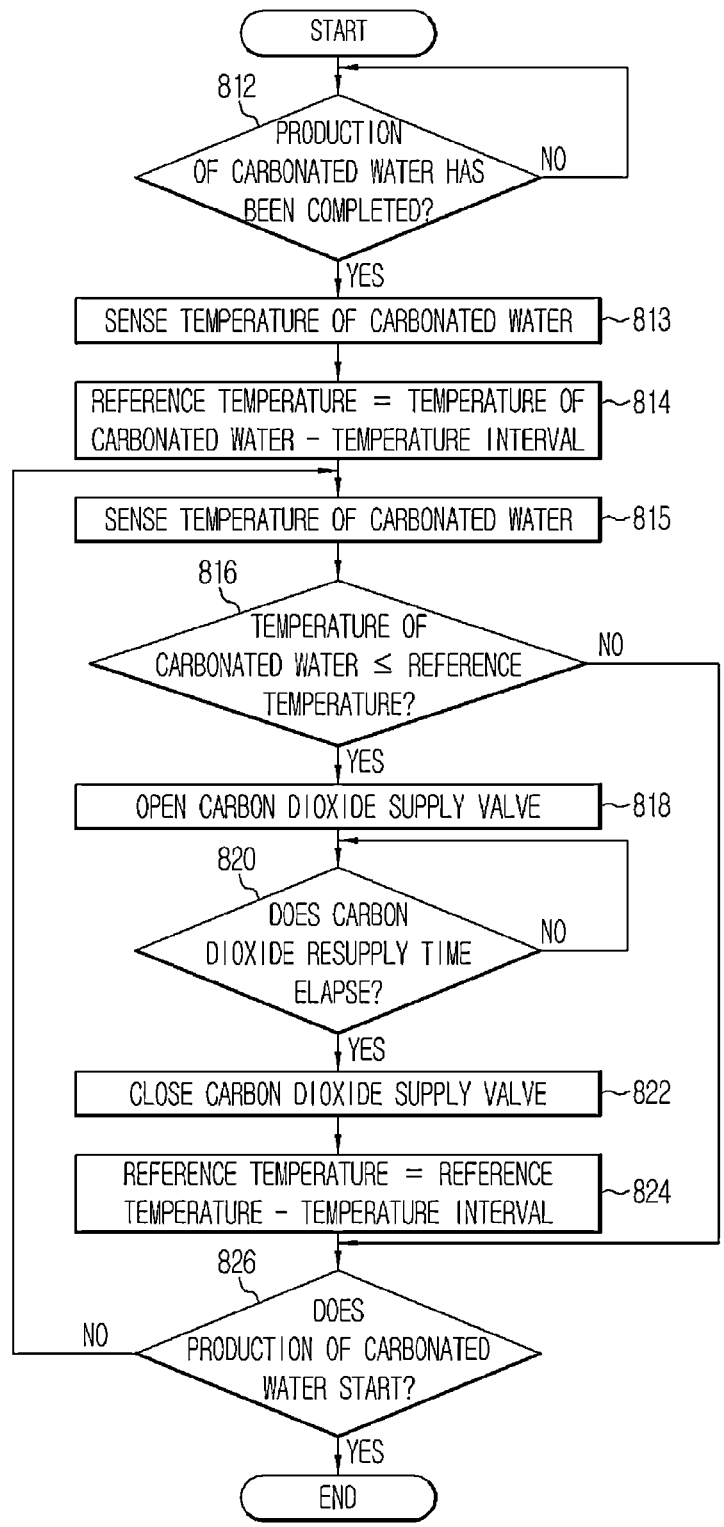
FIGS. 17A through 17C are flowcharts illustrating the case that the refrigerator of FIG. 1 resupplies carbon dioxide to a carbonated water tank.

FIG. 17A is a flowchart illustrating the case that the refrigerator 1 of FIG. 1 resupplies carbon dioxide to the carbonated water tank 110 according to the temperature of carbonated water.

Referring to FIG. 17A, first, the refrigerator 1 determines whether production of carbonated water has been completed (812).

If it is determined that production of carbonated water has not been completed (NO of 812), the refrigerator 1 waits until production of carbonated water is completed, and if production of carbonated water is completed (YES of 812), the refrigerator 1 senses the temperature of carbonated water through the temperature sensor 112 (813), the refrigerator 1 sets a difference between the temperature of carbonated water sensed in Operation 813 and a predetermined temperature interval as a reference temperature (814). That is, the reference temperature is initialized as the difference between the temperature of carbonated water immediately after production of carbonated water has been completed and the predetermined temperature interval. For example, if the temperature of carbonated water is 15° C. and the temperature interval is 5° C., the reference temperature is initialized as 10° C.

Subsequently, the refrigerator 1 senses the temperature of carbonated water through the temperature sensor 112 (815).

Subsequently, the refrigerator 1 compares the temperature of carbonated water sensed in Operation 815 with the reference temperature and determines whether the temperature of carbonated water is less than or equal to the reference temperature (816). For example, the refrigerator 1 determines whether the temperature of carbonated water is less than or equal to 10° C.

If it is determined that the temperature of carbonated water is less than or equal to the reference temperature (YES of 816), the refrigerator 1 opens the carbon dioxide supply valve 202 (818), determines whether a carbon dioxide resupply time elapses (820), and if it is determined that the carbon dioxide resupply time elapses (YES of 820), the refrigerator 1 closes the carbon dioxide supply valve 202 (822). That is, if it is determined that the temperature of carbonated water is less than or equal to the reference temperature, the refrigerator 1 resupplies carbon dioxide to the carbonated water tank 110 during a period of the carbon dioxide resupply time. In this case, the carbon dioxide resupply time may be set to 1 second. In this case, since supplying carbon dioxide is used not to produce carbonated water but to maintain an internal pressure of the carbonated water tank 110, the carbon dioxide resupply time may be shorter than a carbon dioxide supply time for producing carbonated water.

After carbon dioxide has been resupplied to the carbonated water tank 110, the refrigerator 1 sets a value that is obtained by subtracting the temperature interval from the reference temperature to a new reference temperature (824). For example, if the reference temperature is 10° C. and the temperature interval is 5° C., 5° C. is the new reference temperature.

If it is determined in Operation 816 that the temperature of carbonated water is not less than or equal to the reference temperature (NO of 816), the refrigerator 1 omits resupplying carbon dioxide to the carbonated water tank 110.

Subsequently, the refrigerator 1 determines whether a carbonated water production condition is satisfied (826), and if production of carbonated water does not start, the refrigerator 1 goes back to Operation 815 and repeatedly senses the temperature of carbonated water and compares the temperature of carbonated water with the reference temperature.

Consequently, whenever the temperature of carbonated water is lowered by the temperature interval when production of carbonated water is completed, the refrigerator 1 resupplies carbon dioxide to the carbonated water tank 110. For example, if the temperature of carbonated water is 15° C. and a first temperature interval is 5° C. when production of carbonated water is completed, whenever the temperature of carbonated water is 10° C., 5° C., and 0° C., the refrigerator 1 resupplies carbon dioxide to the carbonated water tank 110.

The refrigerator 1 of FIG. 1 resupplies carbon dioxide to the carbonated water tank 110 whenever the temperature of carbonated water stored in the carbonated water tank 110 is lowered by a predetermined temperature. However, aspects of the present disclosure are not limited thereto, and when the temperature of carbonated water stored in the carbonated water tank 110 is less than or equal to a predetermined temperature, the refrigerator 1 may resupply carbon dioxide to the carbonated water tank 110.

The second cause of the reduction in the pressure of carbon dioxide in the carbonated water tank 110 is that the amount of carbonated water in the carbonated water tank 110 is reduced. If the user discharges carbonated water after production of carbonated water has been completed, the volume of carbonated water is decreased by the amount of carbonated water discharged by the user and thus the pressure of carbon dioxide in the carbonated water tank 110 is reduced. Thus, if the user discharges carbonated water, the refrigerator 1 resupplies carbon dioxide to the carbonated water tank 110 to increase the pressure of carbon dioxide in the carbonated water tank 110.

Figure 17B:
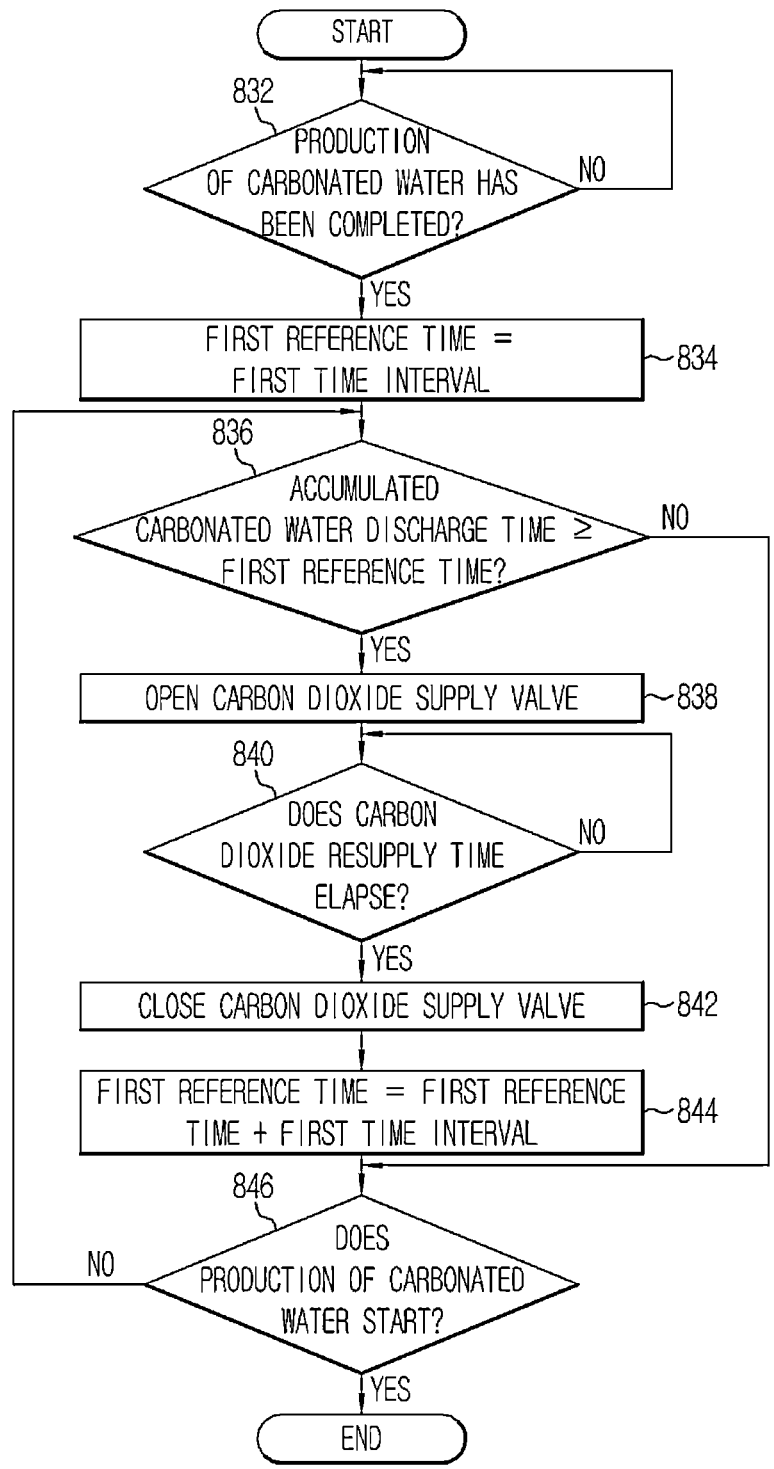

FIG. 17B is a flowchart illustrating the case that the refrigerator 1 of FIG. 1 resupplies carbon dioxide to the carbonated water tank 110 when carbonated water is discharged.

Referring to FIG. 17B, first, the refrigerator 1 determines whether production of carbonated water is completed (832).

If it is determined that production of carbonated water is not completed (NO of 832), the refrigerator 1 waits until production of carbonated water is completed, and if it is determined that production of carbonated water is completed (YES of 832), the refrigerator 1 stores a predetermined first time interval in a first reference time (834). That is, the first reference time is initialized as the predetermined first time interval. In this case, the first time interval varies according to the capacity of the carbonated water tank 110 and the discharge speed of carbonated water. However, if the carbonated water tank 110 is about 1 l and all carbonated water stored in the carbonated water tank 110 is discharged for 1 minute, the first time interval may be set to 10 seconds. That is, the first reference time may be initialized as 10 seconds.

Subsequently, the refrigerator 1 compares an accumulated carbonated water discharge time with the first reference time and determines whether the accumulated carbonated water discharge time is greater than or equal to the first reference time (836). Here, the accumulated carbonated water discharge time means a total time at which the user operates the dispenser lever 93 disposed in the dispenser 90 after carbonated water has been produced so that carbonated water is discharged. That is, the accumulated carbonated water discharge time is the same as the accumulated carbonated water discharge time illustrated in FIG. 11. As described above, the amount of carbonated water that remains in the carbonated water tank 110 may be estimated through the accumulated carbonated water discharge time.

If it is determined that the accumulated carbonated water discharge time is greater than or equal to the first reference time (YES of 836), the refrigerator 1 opens the carbon dioxide supply valve 202 (838) and determines whether the carbon dioxide resupply time elapses (840), and if it is determined that the carbon dioxide resupply time elapses (YES of 840), the refrigerator 1 closes the carbon dioxide supply valve 202 (842). That is, if a time at which carbonated water is discharged by the user is greater than or equal to the first reference time, the refrigerator 1 resupplies carbon dioxide to the carbonated water tank 110 during a period of the carbon dioxide resupply time. In this case, the carbon dioxide resupply time may be set to 1 second. As described above, the carbon dioxide resupply time for maintaining the pressure in the carbonated water tank 110 may be shorter than the carbon dioxide supply time for producing carbonated water.

After carbon dioxide has been resupplied to the carbonated water tank 110, the refrigerator 1 sets the sum of the first reference time and the first time interval as a new reference time (844). For example, if the first reference time is 10 seconds and the first time interval is 10 seconds, 20 seconds are a new first reference time.

If it is determined in Operation 836 that the accumulated carbonated water discharge time is not greater than or equal to the first reference time (NO of 836), the refrigerator 1 omits resupplying carbon dioxide to the carbonated water tank 110.

Subsequently, the refrigerator 1 determines whether a carbonated water production condition is satisfied (846), and if production of carbonated water does not start, the refrigerator 1 goes back to Operation 836 and repeatedly compares the accumulated carbonated water discharge time with the first reference time.

Consequently, whenever the accumulated carbonated water discharge time is increased by the first time interval, because the user discharges carbonated water after production of carbonated water has been completed, the refrigerator 1 resupplies carbon dioxide to the carbonated water tank 110. For example, if the first time interval is 10 seconds, whenever the accumulated carbonated water discharge time is 10 seconds, 20 seconds, 30 seconds, 40 seconds, and 50 seconds, the refrigerator 1 resupplies carbon dioxide to the carbonated water tank 110.

The third cause of the reduction in the pressure of carbon dioxide in the carbonated water tank 110 is that carbonated water is not used but is stored in the carbonated water tank 110 for a long time. If carbonated water is not discharged after being produced but is stored in the carbonated water tank 110 for a long time, carbon dioxide is gradually dissolved in carbonated water and the pressure of carbon dioxide in the carbonated water tank 110 is lowered. Thus, if the user does not discharge carbonated water and carbonated water is stored in the carbonated water tank 110 for a long time, the refrigerator 1 resupplies carbon dioxide to the carbonated water tank 110 to increase the pressure of carbon dioxide in the carbonated water tank 110.

Figure 17C:
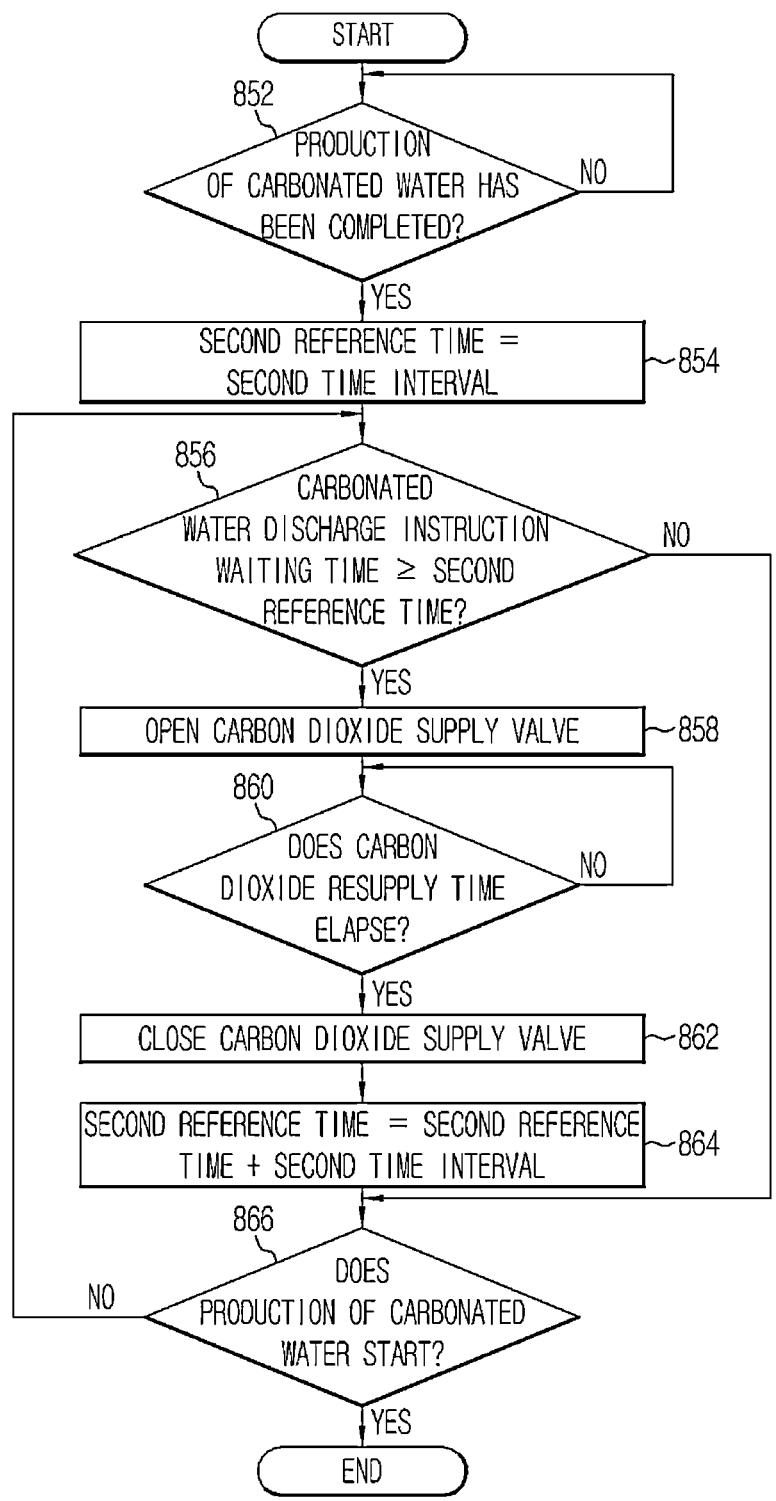

FIG. 17C is a flowchart illustrating the case that the refrigerator 1 of FIG. 1 resupplies carbon dioxide to the carbonated water tank 110 when carbonated water is not discharged.

Referring to FIG. 17C, first, the refrigerator 1 determines whether production of carbonated water is completed (852).

If it is determined that production of carbonated water is not completed (NO of 852), the refrigerator 1 waits until production of carbonated water is completed, and if it is determined that production of carbonated water is completed (YES of 852), the refrigerator 1 stores a predetermined second time interval in a second reference time (854). That is, the second reference time is initialized as a predetermined second time interval. In this case, the second time interval varies according to the capacity of the carbonated water tank 110. However, if the carbonated water tank 110 is about 1 l, the second time interval may be set to 2 hours. That is, the second reference time may be initialized as 2 hours.

Subsequently, the refrigerator 1 compares a carbonated water discharge instruction waiting time with the second reference time and determines whether the carbonated water discharge instruction waiting time is greater than or equal to the second reference time (856). Here, the carbonated water discharge instruction waiting time means a time that elapses until now since the user operates the dispenser lever 93 and carbonated water has been discharged. That is, the carbonated water discharge instruction waiting time is the same as the carbonated water discharge instruction waiting time illustrated in FIG. 11.

If it is determined that the carbonated water discharge instruction waiting time is greater than or equal to the second reference time (YES of 856), the refrigerator 1 opens the carbon dioxide supply valve 202 (858), determines whether the carbon dioxide resupply time elapses (860), and if it is determined that the carbon dioxide resupply time elapses (YES of 860), the refrigerator 1 closes the carbon dioxide supply valve 202 (862). That is, if a time at which the user does not discharge carbonated water is greater than or equal to the second reference time, the refrigerator 1 resupplies carbon dioxide to the carbonated water tank 110 during a period of the carbon dioxide resupply time. In this case, the carbon dioxide resupply time may be set to 1 second. As described above, the carbon dioxide resupply time for maintaining the pressure in the carbonated water tank 110 may be shorter than the carbon dioxide supply time for producing carbonated water.

After carbon dioxide has been resupplied to the carbonated water tank 110, the refrigerator 1 sets the sum of the second reference time and the second time interval as a new reference time (864). For example, if the second reference time is 2 hours and the second time interval is 2 hours, 4 hours are a new second reference time.

If it is determined in Operation 856 that the carbonated water discharge instruction waiting time is not greater than or equal to the second reference time (NO of 856), the refrigerator 1 omits resupplying carbon dioxide to the carbonated water tank 110.

Subsequently, the refrigerator 1 determines whether a carbonated water production condition is satisfied (866), and if production of carbonated water does not start, the refrigerator 1 goes back to Operation 856 and repeatedly compares the carbonated water discharge instruction waiting time with the second reference time.

Consequently, whenever the carbonated water discharge instruction waiting time is increased by the second time interval, because the user does not discharge carbonated water after production of carbonated water has been completed, the refrigerator 1 resupplies carbon dioxide to the carbonated water tank 110. For example, if the second time interval is 2 hours, whenever the carbonated water discharge instruction waiting time is 2 hours, 4 hours, 6 hours, 8 hours, and 10 hours, the refrigerator 1 resupplies carbon dioxide to the carbonated water tank 110.

As described above, filtered water for producing carbonated water is supplied through a water supply source, whereas carbon dioxide is supplied through the carbon dioxide cylinder 120, and the amount of carbon dioxide stored in the carbon dioxide cylinder 120 is limited.

If the greater part of carbon dioxide stored in the carbon dioxide cylinder 120 is exhausted and the pressure of carbon dioxide discharged from the carbon dioxide cylinder 120 is decreased, first of all, the concentration of carbonated water is lowered. That is, since the amount of carbon dioxide supplied to the carbonated water tank 110 is not sufficient, the concentration of carbonated water is lowered. Subsequently, if all carbon dioxide stored in the carbon dioxide cylinder 120 is exhausted, carbonated water is not produced.

In addition, if the pressure of carbon dioxide discharged from the carbon dioxide cylinder 120 is reduced, carbonated water is not discharged through the dispenser 90. As described above, carbonated water is discharged to the outside by an atmospheric pressure in the carbonated water tank 110, and if the pressure of carbon dioxide is reduced, the refrigerator 1 resupplies carbon dioxide to uniformly maintain the pressure of carbon dioxide in the carbonated water tank 110. In this case, if the pressure of carbon dioxide discharged from the carbon dioxide cylinder 120 is reduced, even when carbon dioxide is resupplied to the carbonated water tank 110, the pressure of carbon dioxide in the carbonated water tank 110 cannot be maintained at a sufficient pressure, and if the pressure of carbon dioxide in the carbonated water tank 110 is reduced, carbonated water is not discharged through the dispenser 90.

Thus, the carbon dioxide cylinder 120 needs to be replaced at a predetermined time interval. Thus, the refrigerator 1 of FIG. 1 senses the pressure of carbon dioxide through the pressure sensor 204, and if the sensed pressure of carbon dioxide is less than or equal to a predetermined reference pressure, replacement of carbon dioxide cylinder 120 is displayed on the control panel 300.

Figure 18:
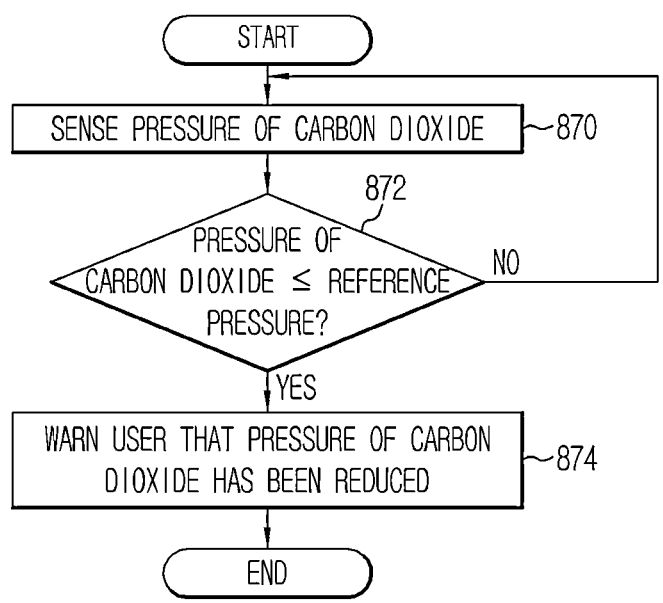
FIG. 18 is a flowchart illustrating the case that the refrigerator of FIG. 1 senses pressure of carbon dioxide.

FIG. 18 is a flowchart illustrating the case that the refrigerator 1 of FIG. 1 senses pressure of carbon dioxide.

Referring to FIG. 18, first, the refrigerator 1 senses the pressure of carbon dioxide through the pressure sensor 204 (870). As described above, the pressure sensor 204 is disposed at an output terminal of the carbon dioxide regulator 201 and senses the pressure of carbon dioxide discharged from the carbon dioxide regulator 201.

Subsequently, the refrigerator 1 compares the pressure of carbon dioxide with a predetermined reference pressure and determines whether the pressure of carbon dioxide is less than or equal to the reference pressure (872).

If it is determined that the pressure of carbon dioxide is not less than or equal to the reference pressure (NO of 872), the refrigerator 1 senses the pressure of carbon dioxide and repeatedly compares the sensed pressure of carbon dioxide with the reference pressure.

If it is determined that the pressure of carbon dioxide is less than or equal to the reference pressure (YES of 872), the refrigerator 1 warns the user that the pressure of carbon dioxide has been reduced (874). That is, the refrigerator 1 warns the user to replace the carbon dioxide cylinder 120 in the carbon dioxide low-pressure display region 305 disposed in the control panel 300. In addition, the refrigerator 1 may stop production of carbonated water if the pressure of carbon dioxide is less than or equal to the reference pressure.

In addition, if it is determined that the pressure of carbon dioxide is less than or equal to the reference pressure, the refrigerator 1 may not produce carbonated water even if the above-described carbonated water production condition is satisfied. For example, even when the water level of carbonated water is less than or equal to a minimum water level, the refrigerator 1 may not produce carbonated water.

When a pressure switch is used as the pressure sensor 204, an output of the pressure switch is connected to the display unit, and if the pressure of carbon dioxide is less than or equal to the reference pressure, the pressure switch may transfer a low-pressure signal to the display unit, and the display unit may display a low pressure of carbon dioxide in the carbon dioxide low-pressure display region 305.

As described above, the refrigerator 1 of FIG. 1 has produced and managed the carbonated water.

Hereinafter, discharging carbonated water using the refrigerator 1 of FIG. 1 according to a user's instruction will be described.

If the user pressurizes the dispenser lever 93 disposed in the dispenser 90 to input a carbonated water discharge instruction, the refrigerator 1 discharges carbonated water by opening the carbonated water discharge valve 231, and if the user stops pressurizing the dispenser lever 93 to input a carbonated water discharge termination instruction, the refrigerator 1 stops discharging of carbonated water by closing the carbonated water discharge valve 231.

Figure 19:
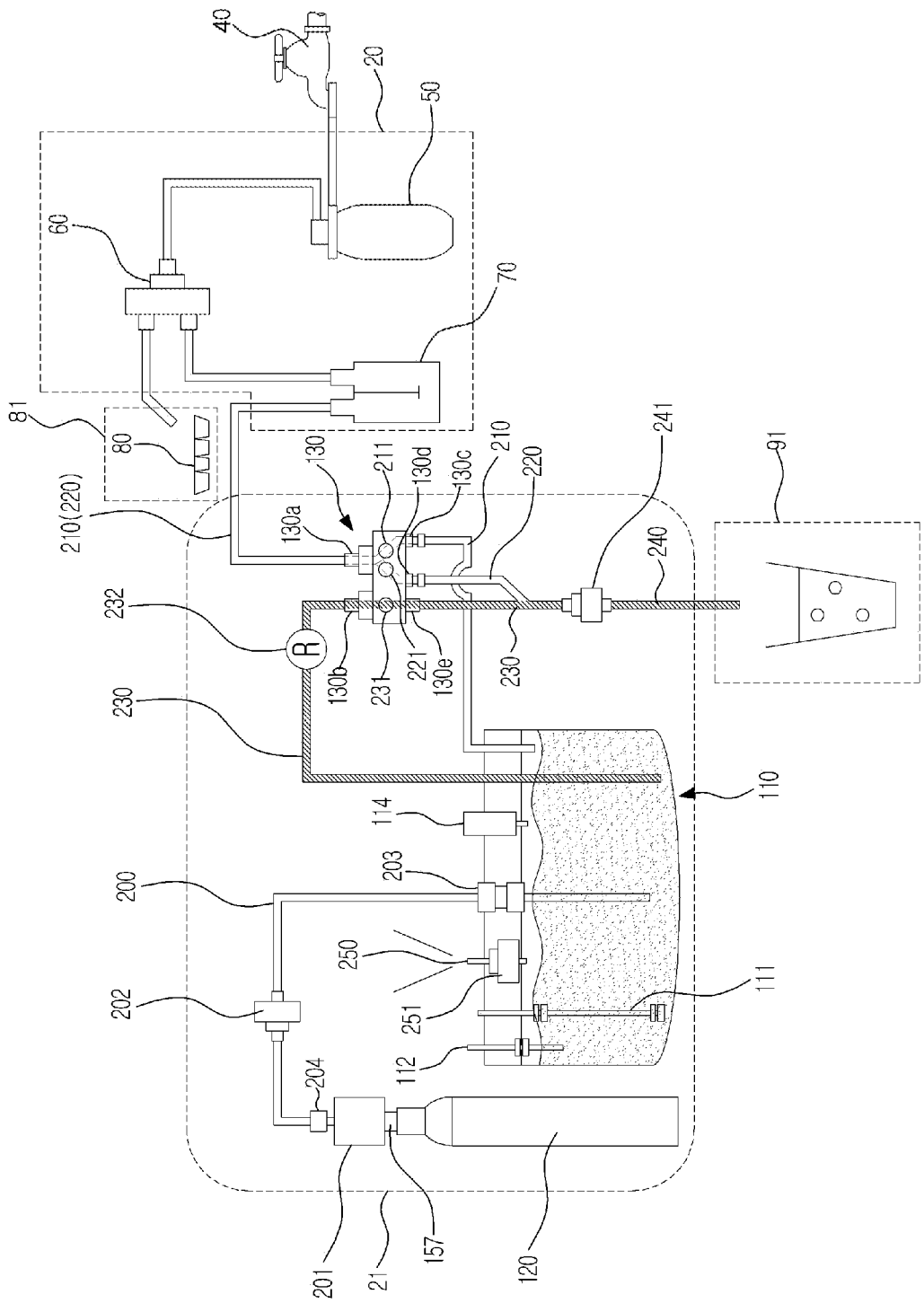
FIG. 19 is a view schematically illustrating the case that the refrigerator of FIG. 1 discharges carbonated water.

FIG. 19 is a view schematically illustrating the case that the refrigerator 1 of FIG. 1 discharges carbonated water.

Referring to FIG. 19, the refrigerator 1 of FIG. 1 discharges carbonated water through the dispenser 90 if a carbonated water discharge instruction is input from the user. In detail, if the refrigerator 1 opens the carbonated water discharge valve 231, carbonated water is moved along the carbonated water discharge flow path 230 from the carbonated water tank 110, and in this procedure, carbonated water is discharged to the outside via the carbonated water regulator 232, the carbonated water discharge valve 231, and the remaining water discharge prevention valve 241.

Figure 20:
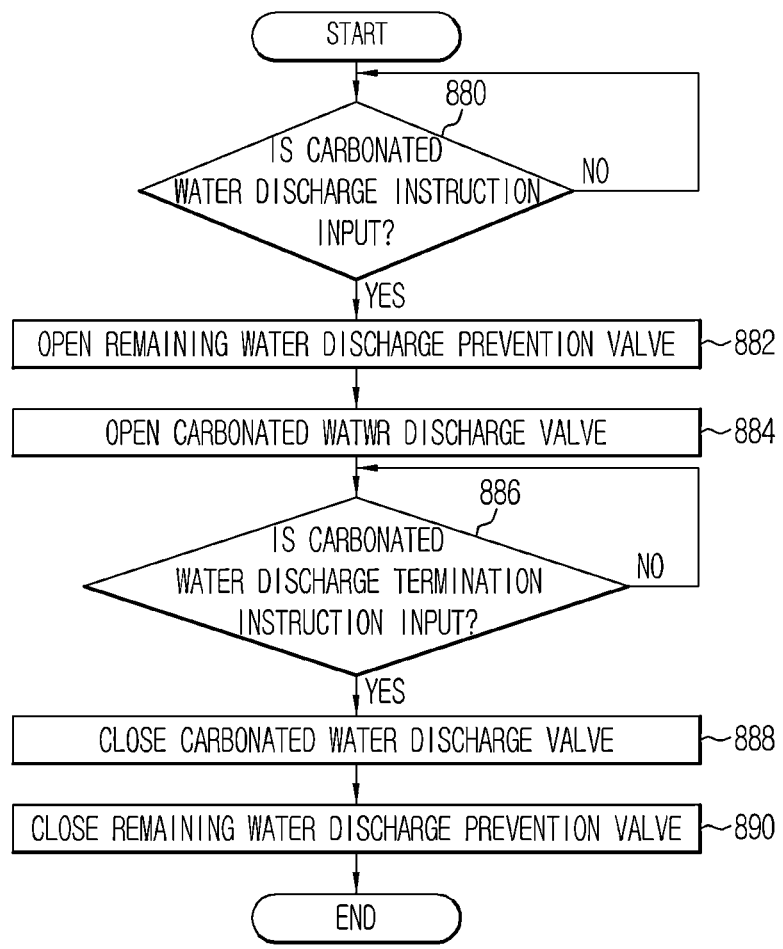
FIG. 20 is a view illustrating the case that the refrigerator of FIG. 1 discharges carbonated water.

FIG. 20 is a view illustrating the case that the refrigerator 1 of FIG. 1 discharges carbonated water.

Referring to FIG. 20, the refrigerator 1 determines whether a carbonated water discharge instruction is input from the user (880). As described above, the user pressurizes the dispenser lever 93 disposed in the dispenser 90 to input the carbonated water discharge instruction.

If the carbonated water discharge instruction is input (YES of 880), the refrigerator 1 opens the remaining water discharge prevention valve 241 (882), and then the refrigerator 1 opens the carbonated water discharge valve 231 (884).

In this way, when carbonated water is discharged, the remaining water discharge prevention valve 241 is first opened and then the carbonated water discharge valve 231 is opened so as to prevent the remaining water discharge prevention valve 241 from being damaged.

In general, the remaining water discharge prevention valve 241 is used to prevent remaining water in the integrated discharge flow path 240 from being discharged and is not designed to withstand a high pressure. That is, the remaining water discharge prevention valve 241 may be easily damaged by the discharge pressure of carbonated water compared to the carbonated water discharge valve 231. In addition, when a large amount of carbon dioxide that is not dissolved in carbonated water exists in the carbonated water tank 110, the discharge pressure of carbonated water may be increased. When the high discharge pressure of carbonated water is suddenly transferred to the remaining water discharge prevention valve 241, the remaining water discharge prevention valve 241 may be damaged.

Subsequently, the refrigerator 1 determines whether the carbonated water discharge termination instruction is input (886). As described above, the user may input the carbonated water discharge termination instruction by stopping pressurizing the dispenser lever 93.

If the carbonated water discharge termination instruction is input (YES of 886), the refrigerator 1 closes the carbonated water discharge valve 231 (888) and then closes the remaining water discharge prevention valve 241 (890).

In this way, when carbonated water discharge is terminated, the carbonated water discharge valve 231 is first closed and then the remaining water discharge prevention valve 241 is closed so as to prevent damage of the remaining water discharge prevention valve 241. That is, if the remaining water discharge prevention valve 241 is closed while carbonated water is discharged, the remaining water discharge prevention valve 241 may be damaged by the discharge pressure of carbonated water.

Consequently, when carbonated water is discharged, the remaining water discharge prevention valve 241 is opened and then the carbonated water discharge valve 231 is opened, and when carbonated water discharge is terminated, the carbonated water discharge valve 231 is closed and then the remaining water discharge prevention valve 241 is closed so that damage of the remaining water discharge prevention valve 241 can be prevented.

According to the spirit of the present disclosure, filtered water and carbonated water can be selectively taken, and since carbon dioxide is periodically supplied to a carbonated water tank storing carbonated water, so that the carbonated water is discharged at a constant pressure.

According to the spirit of the present disclosure, the supply and discharge of carbon dioxide into/from the carbonated water tank is repeatedly performed, so that the carbonated water is rapidly produced.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:
1. A refrigerator comprising:
a carbonated water tank to store carbonated water;
a water tank to store water
a carbon dioxide cylinder to store carbon dioxide;
a carbon dioxide supply valve configured to control flow of the carbon dioxide supplied to the carbonated water tank from the carbon dioxide cylinder; and
a controller to supply the water to the carbonated water tank from the water tank and after the supplying of the water is completed, to open the carbon dioxide supply valve in order to supply the carbon dioxide to the carbonated water tank,
wherein the controller opens the carbon dioxide supply valve to resupply the carbon dioxide to the carbonated water tank when an amount of the carbonated water discharged from the carbonated water tank reaches a predetermined amount.

2. The refrigerator of claim 1, wherein if a carbonated water discharge instruction is input, the carbonated water is discharged by pressure of carbon dioxide in the carbonated water tank.

3. The refrigerator of claim 2,
wherein the controller opens the carbon dioxide supply valve for about 0.5 seconds to about 1.5 seconds with respect to the carbonated water tank so as to resupply the carbon dioxide to the carbonated water tank.

4. The refrigerator of claim 1, further comprising:
a control panel configured to receive operating instructions from a user, the control panel including inputs to select a degree of concentration of carbonation of the carbonated water,
wherein the controller opens the carbon dioxide supply valve based on the operating instructions.

5. The refrigerator of claim 4, wherein the inputs to select the degree of concentration of carbonation of the carbonated water include at least two levels of concentration of carbonation of the carbonated water.

6. A refrigerator comprising:
a carbonated water tank to store carbonated water;
a water tank to store water;
a carbon dioxide cylinder to store carbon dioxide;
a carbon dioxide supply valve to control flow of the carbon dioxide supplied to the carbonated water tank; and
a controller to supply water to supply the carbonated water tank from the water tank and after the supplying of the water is completed, to open the carbon dioxide supply valve in order to supply the carbon dioxide to the carbonated water,
wherein the controller, if determined that pressure of carbon dioxide in the carbonated water tank is below a predetermined reference pressure, reopens the carbon dioxide supply valve to resupply the carbon dioxide to the carbonated water tank.

7. The refrigerator of claim 6, wherein the controller supplies the carbon dioxide for about 0.5 seconds to about 1.5 seconds to the carbonated water tank so as to resupply the carbon dioxide to the carbonated water tank.

8. The refrigerator of claim 6, further comprising:
a temperature sensor to sense temperature of the carbonated water stored in the carbonated water tank,
wherein the controller, if the temperature of the carbonated water sensed by the temperature sensor is equal to or below a predetermined reference temperature, reopens the carbon dioxide supply valve to resupply the carbon dioxide to the carbonated water tank.

9. The refrigerator of claim 6, wherein the controller, if discharge time duration of the carbonated water after the carbonated water is produced is above a first reference time duration, reopens the carbon dioxide supply valve to resupply the carbon dioxide to the carbonated water tank.

10. The refrigerator of claim 9, wherein the controller reopens again the carbon dioxide supply valve to resupply the carbon dioxide to the carbonated water tank if discharge time duration of the carbonated water after the dioxide is resupplied is above the first reference time duration.

11. The refrigerator of claim 6, wherein the controller, if time duration elapsed after the carbonated water is produced is above a second reference time duration, reopens the carbon dioxide supply valve to resupply the carbon dioxide to the carbonated water tank.

12. The refrigerator of claim 11, wherein the controller reopens again the carbon dioxide supply valve to resupply the carbon dioxide to the carbonated water tank if time duration elapsed after the carbon dioxide is resupplied is above the second reference time.

13. A method of controlling a refrigerator producing and storing carbonated water, the method comprising:
opening a water supply valve to supply water to the carbonated water tank;
opening a carbon dioxide supply valve to supply carbon dioxide to the carbonated water tank if supply of the water is completed; and
reopening a carbon dioxide supply valve to resupply the carbon dioxide if pressure of carbon dioxide in the carbonated water tank below a reference pressure.

14. The method of claim 13, wherein the reopening of the carbon dioxide supply valve comprises supplying the carbon dioxide to the carbonated water tank for about 0.5 seconds to about 1.5 seconds.

15. The method of claim 13, wherein the reopening of the carbon dioxide supply valve comprises
sensing temperature of the carbonated water stored in the carbonated water tank; and
if the sensed temperature of the carbonated water is equal to or below a predetermined reference temperature, reopening the carbon dioxide supply valve to resupply the carbon dioxide to the carbonated water tank.

16. The method of claim 13, wherein the reopening the carbon dioxide supply valve comprises:
in response to discharge of the carbonated water, calculating discharge time duration of the carbonated water after carbonated water is produced;
and if the discharge time is above a first reference time duration, reopening the carbon dioxide supply valve to resupply the carbonated water to the carbonated water tank.

17. The method of claim 16, wherein the reopening of the carbon dioxide supply valve further comprises:
if discharge time duration of the carbonated water after the resupplying of the carbon dioxide is above the first reference time duration, reopening again the carbon dioxide supply valve to resupply the carbonated water to the carbonated water tank.

18. The method of claim 13, wherein the reopening of the carbon dioxide supply valve comprises:
if time duration elapsed after the carbonated water is produced is above a second reference time duration, reopening the carbon dioxide supply valve to resupply the carbon dioxide to the carbonated water tank.

19. The method of claim 18, wherein the reopening of the carbon dioxide supply valve further comprises:
reopening again the carbon dioxide supply valve to resupply the carbon dioxide to the carbonated water tank if time duration elapsed after the carbon dioxide is resupplied is above the second reference time duration.

20. The method of claim 13, wherein the supplying of the carbon dioxide to the carbonated water tank comprises repeating discharge of carbon dioxide from the carbonated water tank and supply of carbon dioxide to the carbonated water tank.

21. The method of claim 20, wherein the discharging of carbon dioxide from the carbonated water tank comprises opening an exhaust valve configured to discharge carbon dioxide inside of the carbonated water tank for about 0.5 seconds to about 5 seconds.

22. The method of claim 20, wherein the supplying of carbon dioxide to the carbonated water tank comprises:
opening a carbon dioxide supply valve configured to open and close a carbon dioxide supply flow path to supply carbon dioxide from the carbon dioxide cylinder to the carbonated water tank for about 0.5 seconds to about 10 seconds.

23. The method of claim 20, wherein the repeating of discharge and supply of carbon dioxide comprises repeating discharge and supply of carbon dioxide one time to 10 times.

24. A refrigerator comprising:
a carbonated water tank to store carbonated water;
a water tank to store water;
a carbon dioxide cylinder to store carbon dioxide;
a carbon dioxide supply valve to control supply of the carbon dioxide to the carbonated water tank;
an exhaust valve to control discharge of the carbon dioxide stored in the carbonated water tank; and
a controller to supply the water to the carbonated water tank from the water tank and if after the supplying of the water is completed, to open the carbon dioxide supply valve in order to supply the carbon dioxide to the carbonated water tank,
wherein the controller, if a rapid production instruction is input, repeats discharging of the carbon dioxide from the carbonated water tank and supplying of the carbon dioxide to the carbonated water tank.

25. The refrigerator of claim 24, wherein the rapid production instruction is input through an additional production instruction input unit.

26. The refrigerator of claim 25, further comprising:
an exhaust valve to discharge carbon dioxide inside of the carbonated water tank; and
a supply valve to open and close a carbon dioxide supply flow path that is configured to supply carbon dioxide to the carbonated water tank from the carbon dioxide cylinder,
wherein the controller repeats the opening/closing of the exhaust valve and the opening/closing of the carbon dioxide supply valve.

27. The refrigerator of claim 26, wherein the controller opens the carbon dioxide supply valve in a state that the exhaust valve is closed.

28. The refrigerator of claim 27, wherein the controller opens the exhaust valve for about 0.5 seconds to about 5 seconds.

29. The refrigerator of claim 27, wherein the controller opens the carbon dioxide supply valve for about 0.5 seconds to about 10 seconds.

30. The refrigerator of claim 27, wherein the controller repeats the opening/closing of the exhaust valve and the opening/closing of the carbon dioxide supply valve one time to 10 times.

* * * * *

UNITED STATES PATENT AND TRADEMARK OFFICE
CERTIFICATE OF CORRECTION

PATENT NO. : 8,905,383 B2  
APPLICATION NO. : 14/189184  
DATED : December 9, 2014  
INVENTOR(S) : Kyung Tae Ko Page 1 of 1

It is certified that error appears in the above-identified patent and that said Letters Patent is hereby corrected as shown below:

On the Title Page

Column 2, Item [57] (Abstract), Line 14, Delete "lever" and insert -- level --, therefor.

In the Claims

Column 30, Line 61, In Claim 1, after "store water" insert -- ; --.
Column 31, Line 40, In Claim 6, delete "water," and insert -- water tank, --, therefor.
Column 32, Line 20, In Claim 13, delete "tank" and insert -- tank is --, therefor.
Column 33, Line 24, In Claim 13, after "and" delete "if".

Signed and Sealed this
Twenty-first Day of July, 2015

Michelle K. Lee
*Director of the United States Patent and Trademark Office*